United States Patent [19]

Goodwin

[11] Patent Number: 4,838,309

[45] **Date of Patent: * Jun. 13, 1989**

[54] VARIABLE FLOW GAS VALVE

[75] Inventor: Vernon L. Goodwin, Charlotte, N.C.

[73] Assignee: SSI Medical Services, Inc., Charleston, S.C.

[ * ] Notice: The portion of the term of this patent subsequent to Jan. 17, 2006 has been disclaimed.

[21] Appl. No.: 114,097

[22] Filed: Oct. 27, 1987

Related U.S. Application Data

[60] Division of Ser. No. 912,774, Sep. 26, 1986, Pat. No. 4,768,249, which is a continuation-in-part of Ser. No. 814,610, Dec. 30, 1985, Pat. No. 4,745,647.

[51] Int. Cl.[4] .......... F16K 37/00; F16K 31/02; A47C 27/10

[52] U.S. Cl. .......... 137/554; 137/883; 251/205; 251/266; 251/129.11; 340/870.35; 5/456

[58] Field of Search .......... 137/554, 883; 251/205, 251/266, 267, 268, 129.11; 340/870.35

[56] References Cited

U.S. PATENT DOCUMENTS

| | | | |
|---|---|---|---|
| 1,805,106 | 5/1931 | Robinson | 251/205 |
| 1,850,850 | 3/1932 | Peterson | 251/205 |
| 1,898,147 | 2/1933 | Smith | 251/266 |
| 2,914,088 | 11/1959 | Beaman et al. | 251/266 X |
| 3,068,902 | 12/1962 | Brumbaugh | 251/205 |
| 3,092,141 | 6/1963 | Stark | 137/883 |
| 3,433,261 | 3/1969 | Fox | 137/883 X |
| 3,459,221 | 8/1969 | Axelrod | 137/883 |
| 3,563,268 | 2/1971 | Williams | 251/266 X |
| 3,810,136 | 5/1974 | Lang et al. | 340/870.35 |
| 3,820,094 | 6/1974 | Mouri et al. | 340/870.35 |
| 4,471,942 | 9/1984 | Kocanowski | 251/205 |
| 4,609,074 | 9/1986 | Berrend | 137/883 |

*Primary Examiner*—John Rivell
*Attorney, Agent, or Firm*—Dority & Manning

[57] ABSTRACT

A multi-outlet, variable flow, gas valve connects a blower to the pipes and comprises a housing defining an inlet and a passageway. The valve housing further defines at least two cylinder chambers communicating with the passageway and a discrete outlet for each cylinder chamber communicating therewith. A piston is substantially non-rotatably disposed inside each cylinder chamber and has a threaded opening through the center thereof which receives a threaded portion of a rotatable shaft therethrough. One end of the shaft is rotated by a motor, and the other end of the shaft is connected to an axle of a potentiometer.

14 Claims, 11 Drawing Sheets

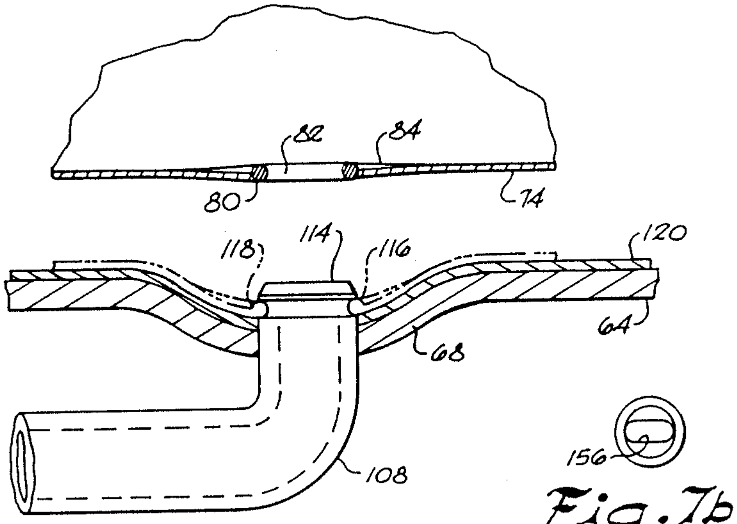
Fig. 7b
Fig. 6
Fig. 7c
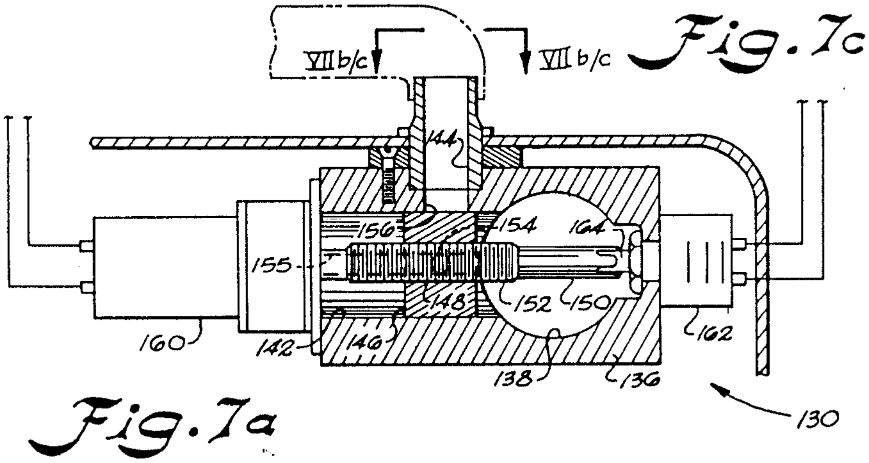
Fig. 7a
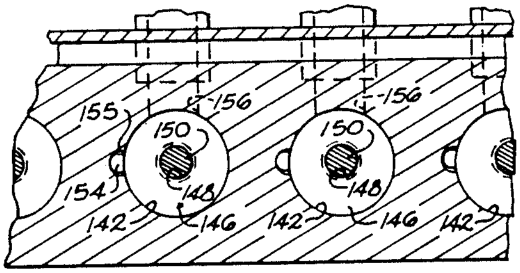
Fig. 8

VARIABLE FLOW GAS VALVE

This is a division of application Ser. No. 912,774 filed on Sept. 26, 1986 now U.S. Pat. No. 4,768,249 which is a continuation-in-part application of Application Serial No. 814,610, filed Dec. 30, 1985 now U.S. Pat. No. 745,647.

BACKGROUND OF THE INVENTION

The present invention relates to an improved patient support structure, and more particularly to a patient support structure having a plurality of gas-filled sacks upon which the patient is supported.

U.S. Pat. No. 4,488,322 to Hunt et al discloses a mattress and bed construction having inflatable air sacks mounted on the mattress and connected to ports of header chambers which are incorporated in the mattress. Air is supplied to the sacks via conduits connected to the header chambers. The mattress is laid on the rigid, tubular steel frame base of a standard hospital bed. The inflatable sacks are mounted transversely of the mattress and connected to the header chambers on opposite sides by releasable connectors. Air is passed into the header chamber on one side of the mattress and exhausted from the air sack on the opposite side through a corresponding exhaust header chamber. A control valve regulates the flow of air which is permitted to escape from the exhaust header chambers to permit individual control of the pressure and rate of flow of air through each air sack or group of air sacks. The air sacks are divided into groups so that the sacks in each group can be set at a pressure which is appropriate for the part of the patient's body which is supported at that point. The air inlet and exhaust ports and control valves are grouped together in a single housing or pair of housings located at one end of the mattress. The control valves prevent air leakage from one of the air sacks from affecting the remainder of the sacks. A bellows is provided for adjusting the contour or overall shape of the mattress, and remotely operated air valves are provided for operating the bellows. The remotely operated air valve comprises a chamber divided by a flexible diaphragm into an inlet and an outlet, the diaphragm being movable between two extreme positions. The outlet includes a tube which projects into the chamber, and at one of the extreme positions of the diaphragm, the end of this inlet tube is sealed by the diaphragm. When the diaphragm is at its other extreme position, the diaphragm allows air to escape into the chamber through the tube.

In U.S. Pat. No. 4,099,276 to Hunt et al, a support appliance is disclosed as having articulated sections in which at least one section is raised pneumatically by means of a bellows, the raisable section having a hinged connection with the adjacent section to allow relative movement of the pivoting sections longitudinally of the appliance during relative angular movement. A control valve is disposed between the bellows and a source of pressurized air, the control valve being arranged to feed air automatically to the bellows as required to maintain the bellows in a predetermined inflated condition. The valve is connected to the hinged portion of the bed by a mechanical connection such as a line and pulley system which is able to accommodate the movement of the hinged part relative to the fixed part of the bed because the axis about which the hinged portion pivots, is not fixed. This movable axis eliminates the problem of the inflated sacks preventing the desired pivoting movement.

U.S. Pat. No. 3,909,858 discloses a bed comprising air sacks formed with excess material which is used to attach the sacks to an air supply manifold, with the air pressure cooperating with the excess material to create a seal.

British Patent specification No. 1,273,342, published on May 10, 1972, discloses an air fluidized bed having a plurality of inflatable air cells, which are either formed of porous material or provided with air escape holes that provide air circulation beneath the patient. As shown in FIGS. 3–5 of the British patent, the cells are contiguously arranged and disposed in three end to end or longitudinally aligned rows that are also transversely aligned, i.e., across the mattress from one side to the other. Valves are provided for independently inflating groups of cells so that the cells supporting the different regions of the patient can be provided with different levels of air pressure. The cells rest upon an articulatable bed frame. The supply of compressed air is temperature controlled and filtered. In an alternative embodiment, three cells are formed from a single piece of material, gussets or fillets being provided between the cells. FIG. 8.

OBJECTS AND SUMMARY OF THE INVENTION

It is a principal object of the present invention to provide an improved patient support structure comprising a plurality of inflatable sacks in which combinations of adjacent sacks define support zones that support different regions of the patient at differing sack pressures without causing distortion of the shapes of the sacks defining the extreme sacks of adjacent support zones of differing pressures.

It is a further object of the present invention to provide an improved patient support structure comprising a plurality of inflatable sacks that are divided into support zones which are provided with a means of easily altering the number of sacks in each zone to accommodate patients who vary widely in height, weight and body shape.

Another object of the present invention is to provide an improved patient support structure comprising a plurality of inflatable sacks having means for varying the rate of delivery of gas to the sacks to allow modest flows for small people, greater flows for large people, and a still larger flow to overinflate the bags for facilitating patient transfer from the support structure.

A still further object of the present invention is to provide an improved patient support structure comprising a plurality of inflatable sacks wherein a number of adjacent sacks are provided with means for conveniently deflating same for lowering a patient closer to the floor and stabilizing the patient before removal from the support structure.

Another object of the present invention is to provide an improved patient support structure comprising a plurality of inflatable sacks atop a rigid planar surface, wherein means are provided for quickly deflating particular sacks for lowering a patient supported thereon to the planar surface to facilitate application of an emergency medical procedure, such as CPR, which requires a solid surface beneath the patient.

A further object of the present invention is to provide an improved patient support structure comprising a plurality of inflatable sacks, wherein the structure is articulatable to elevate different portions thereof and the pressures in adjacent sacks at a particular location automatically adjust according to the degree of elevation of the patient.

Another object of the present invention is to provide an improved patient support structure comprising a plurality of inflatable sacks, the support structure being articulatable and provided with automatic step-wise adjustment of pressures in the sacks as the support structure is elevated and further permitting a limited range of continuous pressure adjustment under the control of the patient.

It is a further object of the present invention to provide an improved patient support structure that is articulatable and has a plurality of inflatable sacks wherein the sacks and users are protected against pinch points during articulation of the structure, and the structure is easily cleanable and prevents fluid discharges from soiling the structure.

An additional object of the present invention is to provide an improved patient support structure having a plurality of inflatable sacks that protects a patient being moved across the support structure, from any skin damage that otherwise might result from contact with the fittings used to connect the sacks with a gas source.

A further object of the present invention is to provide an improved patient support structure comprising a plurality of inflatable sacks that provides a means of signaling when a portion of the patient is resting against an insufficiently inflated sack.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the improved patient support structure of this invention comprises a frame and a plurality of elongated inflatable sacks. Disposed side-by-side atop the frame, the sacks having opposing side walls, opposing top and bottom walls, and opposing end walls. Some of the sacks have at least one vertical slit extending through both opposing side walls from the top wall almost to the center of the side wall. In sacks having only a single slot, the slot is positioned at the center of the sack. In sacks having two slots, the slots are spaced evenly from each other and from the ends of the sack so as to divide the top wall of the sack into three sections of equal length.

The end walls of the sacks have upper and lower attachment means thereon.

Gas supply means is provided in communication with each of the sacks for supplying gas to same. The gas supply means preferably comprises a blower which supplies low pressure air and a plurality of pipes and pipe manifolds for carrying the air from the blower to the individual sacks. The gas supply means further comprises an individual gas conduit means for each sack. The gas conduit means preferably comprises a relatively short length of flexible tubing.

Control means associated with the gas supply means and the sacks is provided for controlling supply of gas to each of the sacks according to a predetermined pressure profile across the plurality of sacks and according to a plurality of predetermined combinations of the sacks. Each combination of sacks defines a separate support zone. The control means preferably includes a multi-outlet, variable flow, gas valve, and a control circuit for the multi-outlet valve that automatically controls the valve settings according to predetermined pressure parameters for the sacks.

Sack retaining means is provided for retaining the sacks in a disposition when inflated such that side walls of same are generally vertically oriented with side walls of adjacent sacks being in contact along at least a significant portion of the heights of same. The retaining means has attachment means thereon matable with the sack attachment means for removable securement of the upper and lower sack attachment means for removable securement of the sacks thereto whereby the sacks when inflated are generally maintained in their vertically oriented disposition irrespective of pressure variance between sacks. The retaining means also has attachment means which is matable with the attachment means provided along the frame and adjacent opposite ends of the sacks.

The upper and lower attachment means on the end walls of the sacks preferably comprises upper and lower snap members. The retaining means attachment means and the attachment means provided along the frame adjacent opposite ends of the sacks, also preferably comprise snap members of the type preferred for the upper and lower attachment means of the sacks. The upper snap members preferably are high retention force snaps, while the lower snaps can be snaps of lower retention force.

The sack retaining means preferably comprises a plurality of panels formed of material identical to the material forming the sacks and having on one side thereof, snap members matable with the snap members on the end walls of the sacks and with the snap members on the frame.

The present invention further includes a multi-outlet, variable flow, gas valve, comprising a housing defining an inlet and a passageway, the inlet communicating with the passageway; at least one cylinder chamber defined within the housing and communicating with the passageway; a discrete outlet for each of the cylinder chambers and communicating therewith; and means for variably controlling communication of the inlet with each of the outlets through the passageway and through each of the respective cylinder chambers.

The variable communication control means comprises a piston slidably received within each of the cylinder chambers, and means for orienting the piston at a predetermined location within the cylinder chamber. The piston blocks all communication between each of the outlets and the inlet when the piston is oriented at at least one predetermined location within the cylinder chamber. The piston permits maximum communication between the outlet and the inlet through the cylinder chamber when the piston is oriented at another predetermined location within the cylinder chamber. The piston permits a predetermined degree of communication between each outlet and the inlet through each cylinder chamber depending upon the orientation of the piston within each cylinder chamber.

The means for orienting the piston at a predetermined location preferably comprises a threaded opening extending through the piston and concentric with the longitudinal centerline thereof, a shaft having a threaded exterior portion engaging the threaded opening of the piston, means for precluding full rotation of the piston, and means for rotating the shaft whereby rotation of the shaft causes displacement of the piston along the shaft in the cylinder chamber. The direction of the displacement depends on the direction of rotation of the shaft. The means for precluding full rotation of the piston preferably comprises a projection extending from the piston into a channel formed in the cylindrical side wall of the cylinder chamber. The shaft rotation means preferably comprises a DC electric motor attached to one end of the shaft, either directly or through a reduction gear box.

The multi-outlet, variable flow, gas valve further comprises means for indicating the degree of communication between each of the outlets and the inlet that is being permitted by the piston. The indicating means preferably comprises a potentiometer having a rotatable axle attached to one end of the shaft, for varying the voltage across the potentiometer depending upon the number of rotations of the shaft.

The multi-outlet, variable flow, gas valve further comprises flow restriction means received within each outlet. Preferably, the flow restriction means comprises an elongated-shaped opening defined in the housing between the cylinder chamber and the outlet. The longitudinal axis of the opening is oriented parallel to the longitudinal axis of the shaft.

The present invention further comprises means associated with the frame for sensing the degree of articulation of one of the articulatable sections of the frame. The articulation sensing means preferably comprises a rod having one end communicating with one of the articulatable sections of the frame whereby articulating movement of the frame section displaces the rod along the longitudinal axis thereof. In a preferred embodiment, the rod forms part of a step-wise linear switch which produces step-wise changes in a reference signal depending upon the angle of inclination of the frame. Thus, the articulation sensing means performs a step-wise sensing function. In another embodiment, the rod has a cam on the opposite end thereof which engages a plurality of cam-actuatable switches as the rod is displaced along its longitudinal axis during articulation of the frame. Engagement of the switch by the cam, sends an electrical signal to be used in a circuit comprising part of the present invention. The placement of each cam-actuatable switch relative to the cam of the rod, determines the angle of articulation of the frame that will be sensed by this particular embodiment of the articulation sensing means. This embodiment of the articulation sensing means also performs a step-wise sensing function.

The multi-outlet valve control circuit further comprises articulation pressure adjustment means to vary the pressure in the sacks of each support zone, according to the degree of articulation sensed by the articulation sensing means. In the preferred embodiment, the articulation pressure adjustment means comprises a step-wise variable resistor, such as a thumbwheel switch, and an integrated circuit communicating with the articulation sensing means and selecting one of the preset thumbwheel switches according to the degree of articulation determined by the articulation sensing means. In another embodiment, the articulation pressure adjustment means comprises a plurality of preset variable resistors instead of the thumbwheel switches.

The accompanying drawings, which are incorporated in and constitute a part of this specification, illustrate embodiments of the invention, including the presently preferred embodiment, and, together with the description, serve to explain the principles of the invention. However, the invention is not limited to the specific embodiments illustrated in the drawings, which now are briefly described.

BRIEF DESCRIPTION OF THE DRAWINGS

FIG. 6 is a detailed cross-section of components of an embodiment of the present invention shown in FIG. 5, with a connected condition indicated in phantom;

FIG. 7*a* is a cross-sectional view of components of an embodiment of the present invention taken along the line VIIa—VIIa of FIG. 9;

FIG. 7*b* is a top plan view taken along the lines VIIb—VIIb of FIG. *7a;*

FIG. 7*c* is a top plan view taken along the lines VIIc—VIIc of FIG. *7a;*

FIG. 8 is a cross-sectional view taken along the lines VIII—VIII of FIG. 9;

DESCRIPTION OF THE PREFERRED EMBODIMENTS

Reference will now be made in detail to the present preferred embodiments of the invention, examples of which are illustrated in the accompanying drawings.

The improved patient support structure of the invention comprises a frame which is capable of being elevated and articulated. In the embodiment of the invention shown in FIG. 1, the frame is designated generally by the numeral 30 and comprises a plurality of connected rigid members of a conventional articulatable hospital bed frame. Conventional means are provided for rendering the frame articulatable and for powering the movement of the articulatable sections of the frame. As is conventional, each articulatable section defines a joint 32 (FIGS. 3 and 4) for articulating movement thereabout by each articulatable section. A suitable frame is manufactured by Hill Rom of Batesville, Ind. Preferably, the frame comprises three sub-frames, including a lower frame, a mid-frame and an upper frame, the latter designated generally by the numeral 34 in FIGS. 2, 3 and 13.

Figure 1:
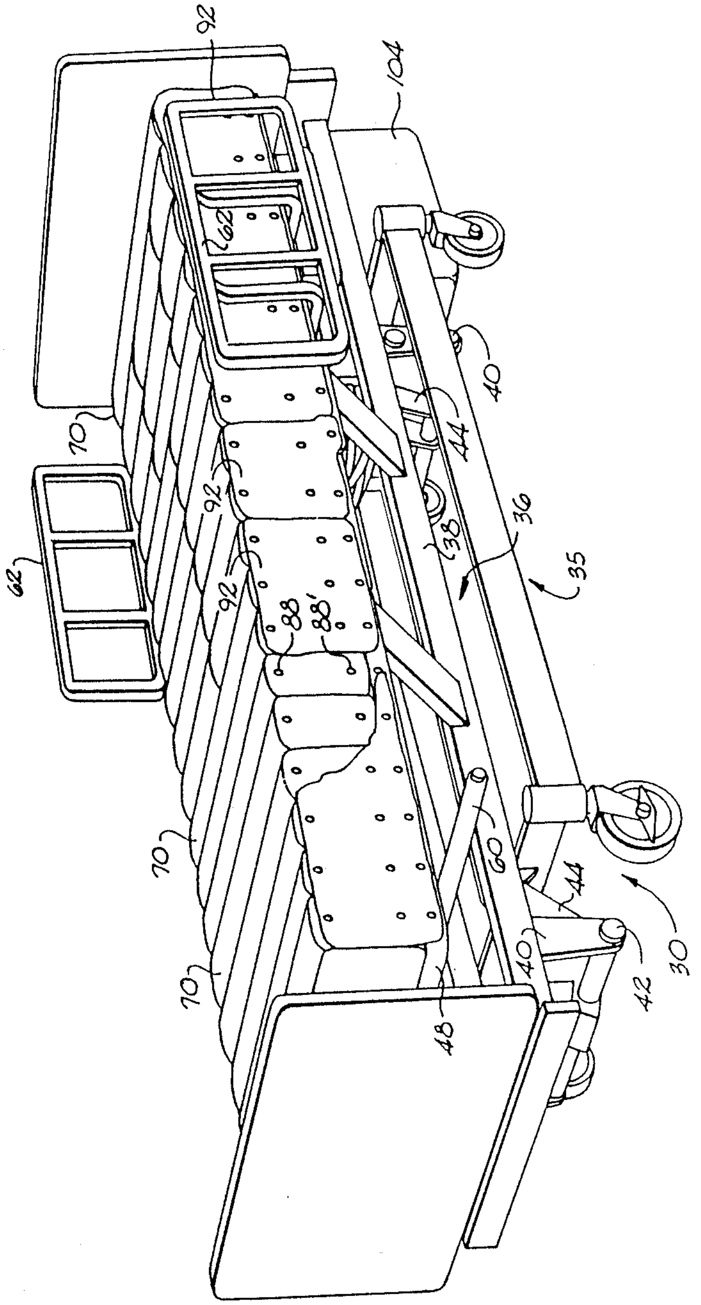
FIG. 1 is a side elevation view of an embodiment of the invention.

As shown in FIG. 1, the frame further comprises a mid-frame 36, which also is rectangular and formed by side bars connected to two end bars. Four side struts 40 depend from the mid-frame and have at their free ends provision for holding the ends of an axle 42 which extends between two opposed side struts 40. Four elevation struts 44 are provided with one end of each elevation strut pivotally attached to the shaft and the other end of each elevation strut pivotally attached to a mounting on the lower frame.

As shown in FIGS. 2–6 and 13, the frame also includes an upper frame member 34, which measures in its horizontal fully extended state approximately 7 feet by 3 feet and is preferably defined by a plurality of side angle irons 46 and a pair of C-shaped angle irons 48 at opposite ends of the upper frame member. The number of side angle irons comprising the upper frame member is dependent upon the number of articulatable sections to be provided in the support structure. Preferably, as shown in FIG. 3, the upper frame includes a head section, a seat section, a thigh section, and a calf section. A pair of side angle irons are aligned opposite each other to define the seat section of the upper frame. Similarly, another pair of side angle irons are aligned opposite one another to define the thigh section of the upper frame. One of the C-shaped angle irons at one end of the upper frame defines the head section, while the other C-shaped angle iron defines the calf or foot section.

The lower framer, generally 35, preferably comprises four members formed in a rectangle, and rests on four swiveling wheels. One wheel is received within the lower frame at each corner thereof. At least one middle support brace extends between the two side members of the lower frame to provide additional structural support.

As shown in FIG. 1, the frame further comprises a mid-frame 36, which also is rectangular and formed by side bars connected to two end bars. Four side struts 40 depend from the mid-frame and have at their free ends provision for holding the ends of an axle 42 which extends between two opposed side struts 40. Four elevation struts 44 are provided with one end of each elevation strut pivotally attached to the shaft and the other end of each elevation strut pivotally attached to a mounting on the lower frame.

Figure 4:
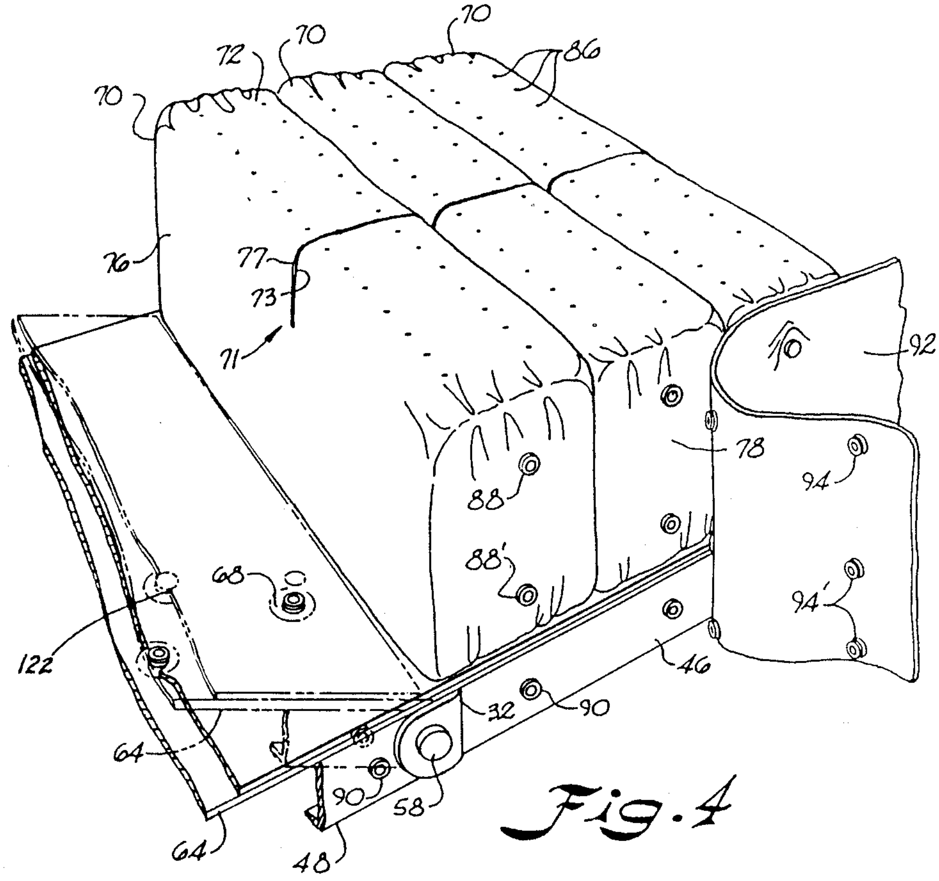
FIG. 4 is a partial perspective view of components of an embodiment of the present invention.

As shown in FIG. 4, the side angle irons are connected to the C-shaped angle irons and to one another by pivoting connections at joints 32. For example, a bearing (not shown) is received within an opening (not shown) at opposite ends of the side angle iron, the bearing carrying a journal 58 to permit pivoting movement between adjacent angle iron members.

As shown in FIG. 1, the upper frame is connected to the mid-frame by a plurality of depending struts 60 which are pivotally mounted at their opposite ends to one of the mid-frame or the upper frame. The frame members can be formed from any sturdy material such as 11 guage steel.

As shown in FIG. 1, the frame also may include a plurality of side guard rails 62. Guard rails 62 may be vertically adjustable and may be movable from one end of the frame to the other end. Moreover, conventional releasable means (not shown) can be provided for guard rails 62 to permit quick and easy lowering and storage of same. As shown in FIG. 1, the guard rail in the foreground is in a lowered position.

In accordance with the present invention, the frame has a planar upper surface defining a plurality of openings therein. As embodied herein and shown for example in FIGS. 2 and 4–6, upper frame 34 preferably comprises a plurality of flat plates 64 extending between opposed angle irons 46, 48, to provide a planar upper surface for each articulatable section of upper frame 34. The flat plates preferably are attached to the angle irons by conventional mechanical fastening means, such as screws.

In another embodiment (not shown), the upper frame member can comprise an integral member having a planar upper surface and having side members depending therefrom and integral therewith. This alternative embodiment eliminates the need for the fastening means used to attach plates 64 to angle irons 46, 48.

In the embodiment shown in FIGS. 5 and 6, each plate defining the upper surface of the frame, preferably comprises a plurality of openings 66 for allowing passage therethrough of a gas supply means, which carries the gas supplied to each sack to be described hereinafter. In further accordance with the present invention, each plate opening 66 has a depressed portion 68 formed therearound.

Figure 5:
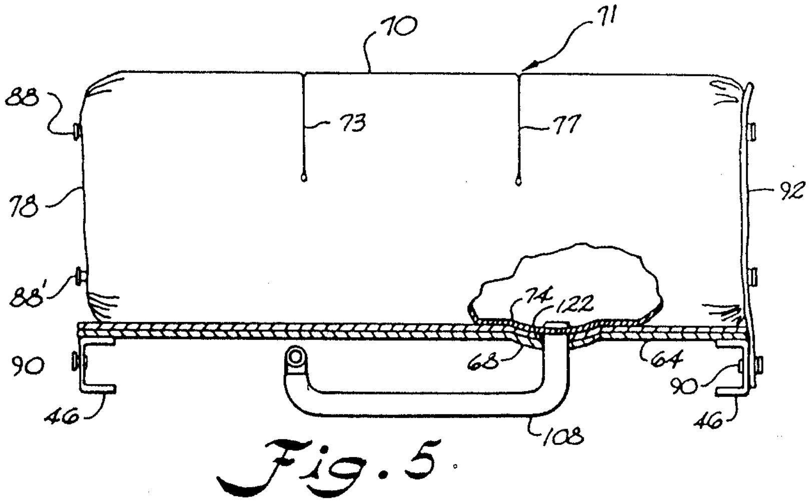
FIG. 5 is a side plan view of components of an embodiment of the present invention.

As shown in FIGS. 1–5, 11 and 13, the improved patient support structure of the present invention also includes a plurality of elongated inflatable sacks 70. When inflated, the sacks are formed into a generally rectangular box shape as shown in FIGS. 1, 4 and 5. Each sack has a top wall 72 opposed to a bottom wall 74, two opposed side walls 76, and two opposed end walls 78. Each of the sack walls is preferably integrally formed of the same material, which should be gas-tight and capable of being heat sealed and laundered. Preferably, the sack walls are formed of twill woven nylon which is coated with urethane on the wall surface forming the interior of the sack. The thickness of the urethane coating is in the range of eight ten-thousandths of an inch to fourthousandths of an inch. Vinyl or nylon coated with vinyl also would be a suitable material for the sack walls. If the material comprising the sacks is disposable, then the material need not be capable of being laundered.

Each sack has an inlet opening 80 (FIG. 6), which is preferably located approximately 14 inches from one end wall 78 thereof and generally centered along the longitudinal center line of the bottom wall. As shown in FIG. 6, an adaptor comprising a sealing ring 82 is formed around the inlet opening and is sealably attached thereto, as by chemical adhesive. Sealing ring 82 preferably is formed of rubber or flexible plastic, for forming a gas-tight seal when received by a mating connector means. Sealing ring 82 preferably is molded with a thin annular disk 84 extending from its outer centroidial axis. Disk 84 facilitates heat sealing of ring 82 to the inlet portion of bottom wall 74 of sack 70.

A plurality of small diameter gas exhaust holes 86 (FIG. 4) are formed through the top wall of some of the sacks near the perimeter thereof and close to the adjacent perimeter of the corresponding side wall. The total number of holes provided in each top wall of each sack and the diameter of the holes depends upon the desired outward flow of air. The position of each sack on the bed constitutes the primary determinant of the desired outward flow of air from the holes in the sack. Preferably each hold 86 has a diameter of 50 thousandths of an inch, but can be in the range of between 18 thousandths of an inch to 90 thousandths of an inch. The actual size depends on the number of holes provided, and on the outward air flow desired.

Figure 2:
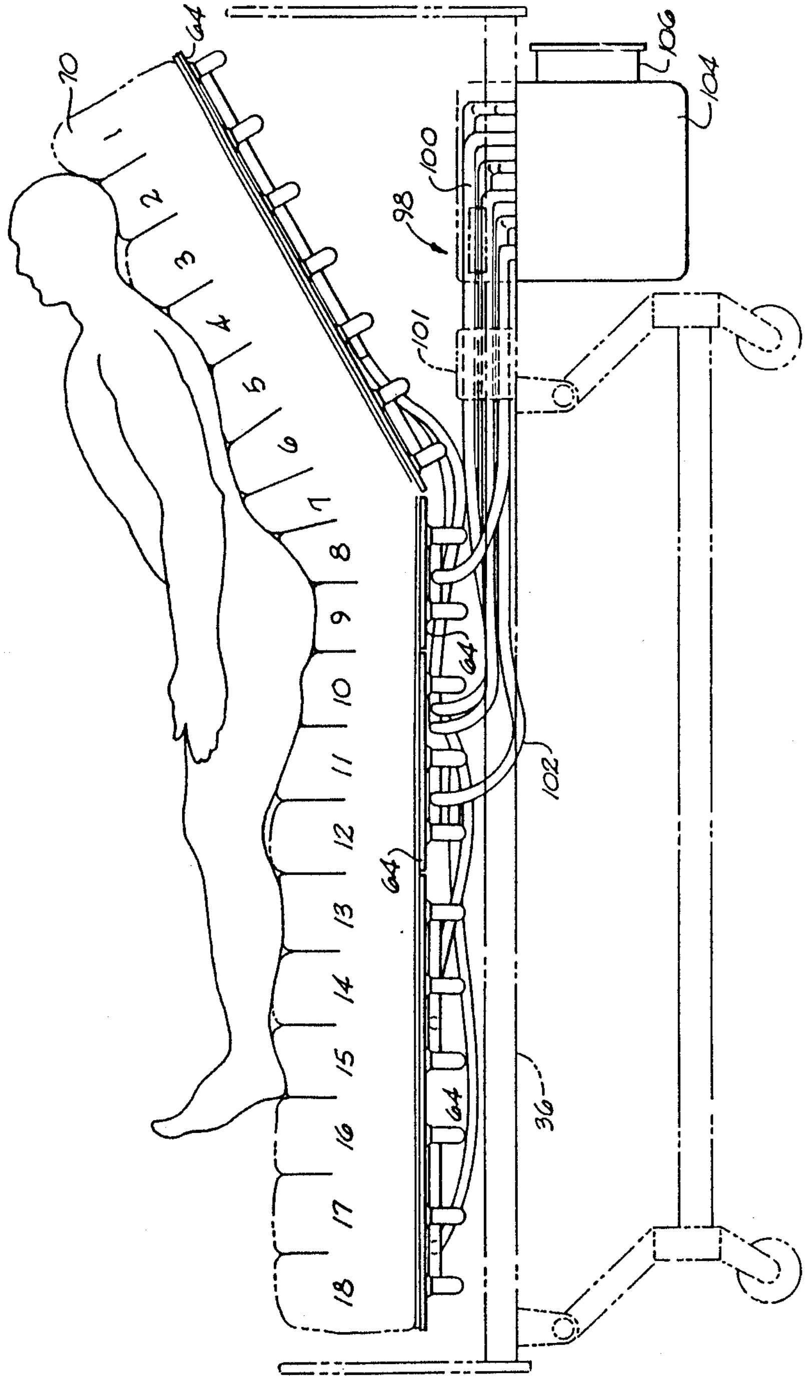
FIG. 2 is a side elevational view of components of an embodiment of the present invention with parts of the frame indicated in phantom.
Figure 11:
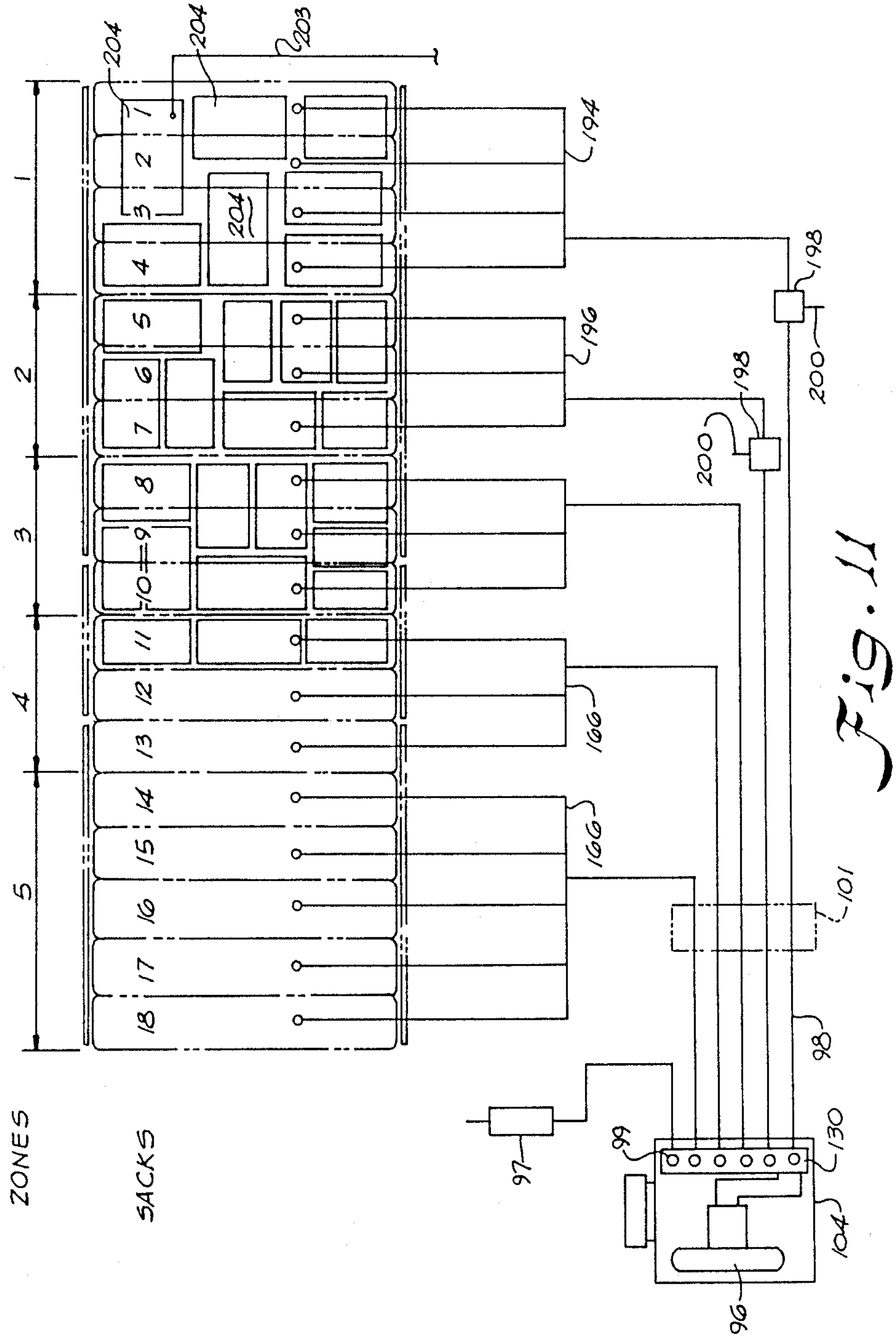
FIG. 11 is a schematic view of components of an embodiment of the present invention.

For ease of reference, the sacks in FIG. 11 have been numbered consecutively, one through eighteen, with sack 1 being the end sack in zone one and sack 18 being the end sack in zone five. Referring to FIG. 2, when each exhaust hole 86 has a diameter of 50 thousandths of an inch, the number of holes provided on each sack is as follows: sack 1 has 28 holes; sacks 2–4 have zero holes; sacks 5–7 have 28 holes; sacks 8–10 have 16 holes; and sacks 11–18 have 28 holes.

The number of sacks can be varied depending on a number of factors, including the size of the support structure. However, as shown in FIGS. 1 and 2, preferably, eighteen individual sacks are provided atop the frame. Each of the sacks preferably measures 36 inches long by 4.5 inches wide by 10 inches tall. Thus, the top wall of each sack is approximately 36 inches in length and about 4.5 inches in width. The preferred height range for the sacks is between 8 inches and 13 inches, and the side and end walls of each sack are preferably approximately 10 inches in height.

In accordance with the present invention, the sacks may be provided with one or more comfort slots. As embodied herein and shown for example in FIGS. 4 and 5, a comfort slot, which is designated generally by the numeral 71, preferably is formed by joining a folded slot portion 73 of top wall 72 to a pair of side walls 76 having vertical slits 77 therethrough. Preferably, as shown in FIGS. 4 and 5, the slits of each side wall are opposed to one another. However, the slits of the two opposing side walls can be non-aligned for some embodiments (not shown). The slit of each side wall preferably extends approximately one-half the height of each side wall.

Preferably, the sacks are provided with no comfort slot, one slot or two slots, depending upon the orientation of the sack upon the top of the bed. As shown in FIG. 1, sacks 1 and 5–10 preferably have a single comfort slot at the center thereof. Sacks 2, 3 and 4 preferably have two equidistantly spaced comfort slots. Sacks 11–18 preferably are not provided with any comfort slots.

A patient is supported atop the support structure primarily by two kinds of forces. One is the bouyant force of the air pressure in the sacks, and the other is the hammocking force provided by the tension in the top surface of the fabric forming the top walls of each sack. The bouyant force provides the most comfortable support for the patient, and it is desirable to increase the proportion of bouyant force which constitutes the supporting force for the patient atop the support structure. The provision of comfort slots in the sacks has been found to reduce the proportion of hammocking force to 50% of the support force. This constitutes an improvement over sacks without comfort slots, since the hammocking force constitutes approximately 70–80% of the support force when no comfort slots are provided in the sacks.

As a general rule, more comfort slots improves the bouyant force/hammock force proportion relative to less comfort slots. Moreover, in general, deeper comfort slots improve the bouyant force/hammock force proportion relative to shallower slots.

In accordance with the present invention, each end wall of each sack is provided with upper and lower attachment means. As embodied herein and shown for example in FIGS. 1, 4 and 5, the attachment means preferably comprises snap members 88 and 88' on the ends of the sacks. Upper snap members 88 comprise the upper attachment means, and lower snap members 88' comprise the lower attachment means. Upper snap members 88 preferably comprise heavy-duty snaps capable of withstanding high retention force levels close to the maximum force level which can be overcome by manual separation of the snap members. Lower snap members 88' preferably require only normal manual force for separation.

Similarly, in further accordance with the present invention, frame attachment means are provided and are located on the frame near the end walls of the sacks. As embodied herein and shown for example in FIGS. 1, 4 and 5, the frame attachment means preferably comprise a plurality of snap members 90 located along angle irons 46, 48 of upper frame member 34 and positioned generally in alignment with upper and lower snap members 88, 88' on end walls 78 of sacks 70 disposed atop the upper frame member.

Figure 12:
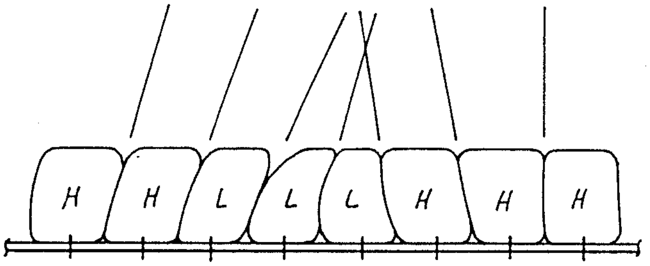
Fig. 12 (PRIOR ART)
FIG. 12 is a side elevational view of a conventional arrangement of air cells of differing pressures in a patient support structure.

FIG. 12 illustrates an undesirable result, known as "rotation," that pertains to conventional inflatable bed structures in which adjacent inflatable sacks are maintained at different pressure levels and are attached to the underlying rigid support structure by a single attachment means generally associated with the lower portion of the sack. The sacks maintained at the higher pressure levels tend to squeeze against the sacks maintained at the lower pressure levels to cause the undesirable rotation effect. One undesirable result of rotation is the destruction of a continuous and uniform support structure for the patient. The non-uniform support structure provides sites for pressure points against the body of the patient. These pressure points may eventually cause bed sores to develop on the patient.

In accordance with the improved patient support structure of the present invention, there is provided sack retaining means for retaining the sacks in a disposition when inflated such that side walls of same are generally vertically oriented, with side walls of adjacent sacks being in contact along at least a significant portion of the heights of same. In further accordance with the present invention, the retaining means has attachment means thereon matable with the upper and lower sack attachment means for removable securement of the sacks thereto. In still further accordance with the present invention, the retaining means attachment means also is matable with the frame attachment means. Attachment of the retaining means attachment means to the upper and lower sack attachment means and to the frame attachment means, generally maintains the inflated sacks in their generally vertically oriented disposition irrespective of pressure variances between the sacks. As embodied herein and shown for example in FIGS. 1, 4, 5 and 13, the retaining means of the present invention preferably comprises a plurality of panels 92, each panel 92 having a width corresponding generally to the height of the end walls of the sacks and having a length corresponding to a whole number multiple of the width of an end wall of a smaller sack. The length of each panel preferably corresponds to the length of each articulatable frame section to which the panel is to be attached. Each panel 92 is formed preferably of material similar to the material used to form the sacks and has on one side thereof attachment means matable with upper and lower sack snap members 88, 88′ and frame snap members 90, as shown in FIGS. 1 and 4. A separate panel 92 preferably is attached to each end wall of the sacks resting atop a particular articulatable section.

Preferably, the attachment means of the retaining means comprises a plurality of snap members 94, 94′ which are matable with the snap members mounted on the sides of the angle irons of the upper frame and with the snap members mounted on the end walls of the sacks. Snap members 94 are heavy-duty snap members for mating with high retention force snap members 88 on the ends of sacks 70. Snap members 94′ are conventional manually operable snap members for mating with lower snap members 88′ on the end walls of sacks 70 and snap members 90 on the frame.

Figure 13:
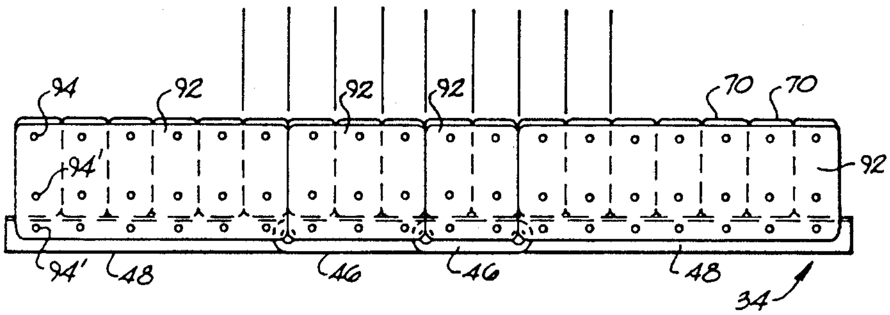
FIG. 13 is a side elevational view of components of an embodiment of the present invention.

As shown in FIG. 13, the sacks are arranged so that the vertical axes extending along the outer edge of each end wall are maintained in a substantially parallel relation to each other and to the vertical axes of the adjacent sack. This condition pertains to the sacks when the frame is in an unarticulated condition, i.e., all in one plane, or to only those sacks atop one of the articulatable sections of the upper frame member. This condition also is illustrated in FIG. 2 with the panels comprising the retaining means removed from view.

The improved patient support structure of the present invention comprises gas supply means in communication with each of the sacks, for supplying gas to same. As embodied herein, the gas supply means preferably comprises a constant speed air blower 96 (FIGS. 9–11) and a plurality of gas pipes 98, (FIG. 2) comprising a supply network for carrying air from blower 96, which compresses and pumps the air through pipes 98 to individual sacks 70. As shown in FIG. 2, the piping comprising the gas supply means preferably includes flexible plastic hoses 102, such as polyvinyl tubing. Blower 96 is preferably contained in a sealed housing 104 (FIGS. 1, 2, 10 and 11) having an air inlet, which is provided with a filter 106 (FIGS. 2 and 10 (phantom)) that removes particulate impurities from the air that is pumped to sacks 70.

Preferably, the air blower comprises an industry standard size three blower, such as manufactured by Fugi Electric. The blower provides an air flow of 50 cubic feet per minute, without back pressure, and is capable of generating a maximum pressure of about 30 inches of water. The blower preferably runs on a single phase voltage supply and draws about 4 amperes of current in performing its function for the present invention.

In further accordance with the present invention, the gas supply means includes an individual gas conduit means for each sack. In the embodiment shown in FIGS. 5 and 6 for example, the gas conduit means preferably comprises about an eight inch length of nominaly ¾ inch inside diameter flexible rubber or polymeric tubing 108. One end of tubing 108 is formed into a conduit connector means to provide a gas impervious seal with adaptor 82 of sack 70. In the detailed drawing of the embodiment shown in FIG. 6, the conduit connector means portion is integrally defined at one end of tubing 108 and forms a "male" connection member 114. Similarly, sealing ring 82 shown in FIG. 6 forms a "female" connection member which matably receives male connection member 114 therein. Alternatively, a "male" connection member 114 can be substituted for sealing ring 82, and the conduit connector means can comprise a matable "female" connection member, as desired. Sealing ring member 82 stretches to fit over a lip 116 of male connection member 114 and is received in an annular groove 118 underneath lip 116 of member 114 to form a gas impervious seal between sealing ring 82 and the conduit connector means.

Each sack is easily disconnected from the conduit connector means because of the flexibility of the afore said tubing forming the individual gas conduit means for each sack. The flexible tubing bends easily to accommodate upward pulling on the sack to permit displacement of the connected sealing ring and conduit connector means from the depressed portion surrounding each opening in the planar surface frame and each membrane opening coincident therewith. The flexibility of the tubing allows a sufficient range of movement of the sack from the upper surface of the frame to permit easy access to and manipulation of, the connection between the sealing ring and the conduit connector means.

In further accordance with the present invention, and as shown in FIGS. 5 and 6 for example, the connector means 114 is freely received in depressed portion 68 formed in the planar upper surface of upper frame member 34 around opening 66. Preferably, when adaptor 82 and the conduit connector means 114 are connected to form a gas impervious seal, the connected structure (shown in FIG. 5) is completely received within depressed portion 68. In this way, no structure protrudes above the height of depressed portion 68 where any such structure otherwise might cause potential discomfort to a patient resting atop the deflated sacks. Such deflated sack condition might become necessary to perform an emergency medical procedure such as cardiopulminary resusitation (CPR). Thus, the patient is protected from contact with the fittings used to connect the sacks with the gas supply means and accordingly is safeguarded against any harm or discomfort that might result from such contact.

In accordance with the improved patient support structure of the present invention, there is provided a flexible fluid impervious membrane received atop the upper planar surface of the frame and covering substantially the entirety of the upper planar surface. As embodied herein and shown for example in FIGS. 4–6, the flexible, fluid impervious membrane of the present invention comprises a sheet 120 of neoprene or other flexible fluid impervious material mounted atop plates 64 and fastened thereto as by application of a chemical adhesive. The membrane of the present invention provides a smooth cleanable surface that catches any fluid discharge from the patient and prevents same from soiling other parts of the patient support structure and the hospital room floor.

In the embodiment shown in FIGS. 4–6, the membrane defines a plurality of openings 122 therethrough. Membrane openings 122 are coincident with openings 66 in the planar upper surface of the frame. Each membrane opening is slightly undersized relative to openings 66 so that any gas conduit member passing through an opening will accordingly be oversized relative to the coincident membrane opening, and therefore a fluid impervious seal will be formed between the membrane and any conduit connector means or other connecting member passing through membrane opening 122. In an embodiment (not shown) of the patient support structure in which the inflatable sacks have inlets on the side walls for example, there would be no need for any opening in either the upper planar surface of the frame or the membrane.

Figure 3A:
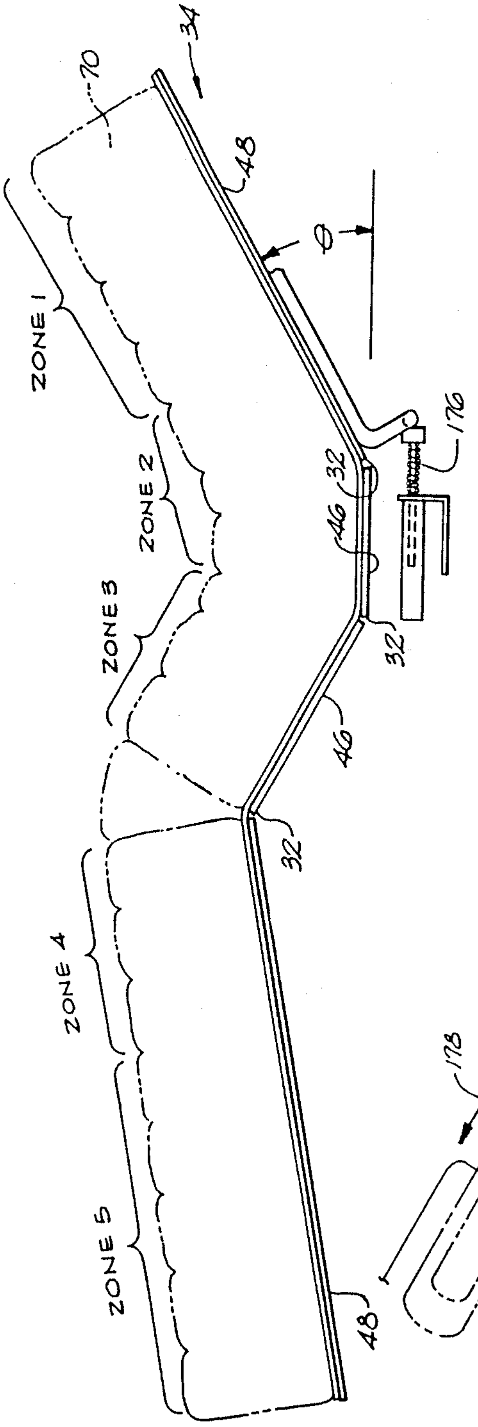
FIG. 3*a* is a schematic view of components of an embodiment of the present invention.

As shown in FIGS. 3*a* and 11, the eighteen sacks preferably comprising the illustrated embodiment of the present invention are nominally allocated into five separate patient support zones, designated zone one, zone two, etc. For ease of reference, the section of the patient support structure which normally supports the patient's head is designated zone one, and the portion of the patient support structure which supports the patient's feet is designated zone five. Zones two, three, and four follow in order between zones one and five. Zone one comprises four sacks. Each of zones two, three and four comprises three sacks. Zone five comprises five sacks.

The speed of blower 96 preferably is kept constant and generates sufficient pressure to maintain each of the bags at a normal pressure of approximately 4.0 inches of water. However, the blower should be capable of supplying enough air flow to maintain the bags at a maximum pressure of approximately 11 inches of water.

Figure 9:
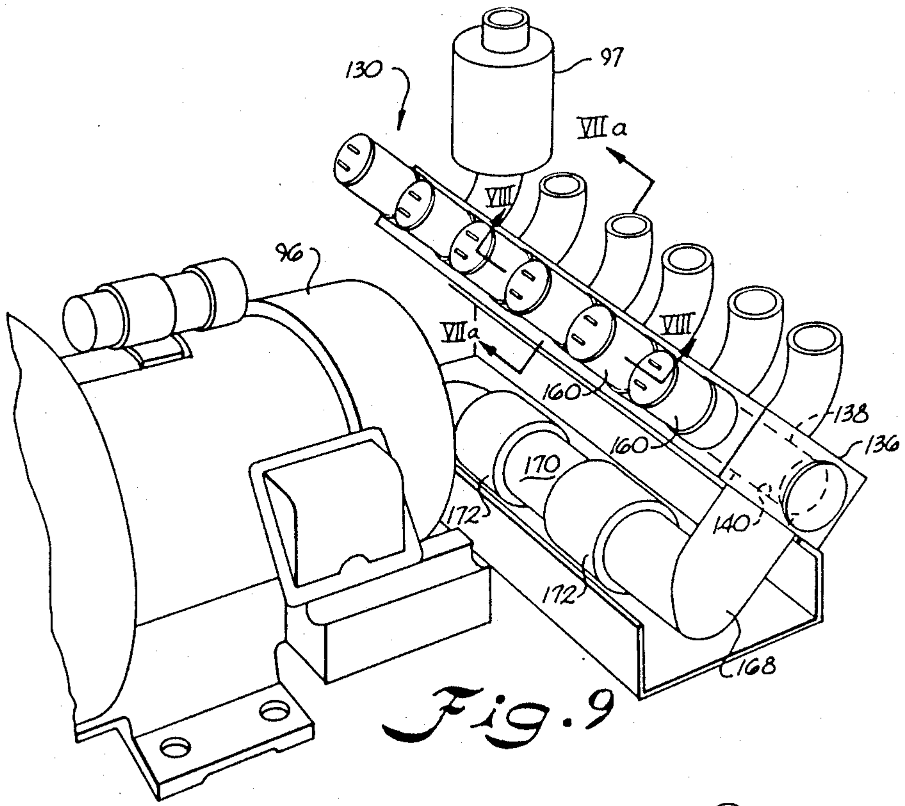
FIG. 9 is a perspective view of components of an embodiment of the present invention.
Figure 10:
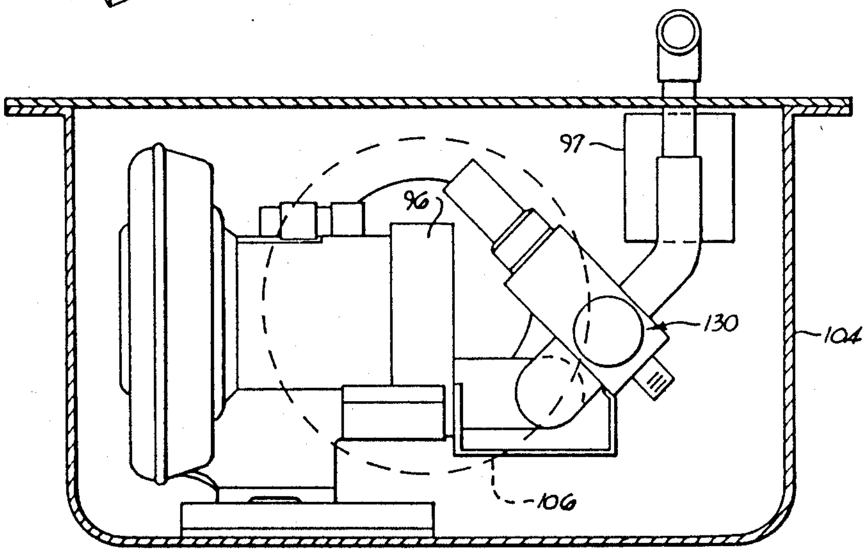
FIG. 10 is a side plan view of components of an embodiment of the present invention.

With the blower running at a constant speed, the flow output from the blower is passed through a multi-output, variable flow, gas valve 130 (FIGS. 7*a*–11). Preferably, multi-outlet valve 130 has six individual variable valve flow paths. One of the flow paths is used as an exhaust valve 99 (FIG. 11) and is vented to atmosphere through a sound muffling device 97 (FIGS. 9–11). Each of the other five flow paths are connected to the gas supply means leading to the sacks in one of the five support zones. Together, the five support zones include all the inflatable sacks of the support structure. The flow setting of the exhaust valve is varied to control the overall amount of flow being provided to the inflatable sacks. Each of the individual valve settings leading to the gas supply means of the sacks in a particular zone also is controlled to vary the proportion of the flow being supplied to the sacks in that zone. In this way, the flow distribution of each particular zone relative to the other four zones is controlled. The specifics of the manner in which control over the pressure in the sacks is effected now will be explained.

In accordance with the present invention, there is provided control means associated with the gas supply means and the sacks, for controlling the supply of gas to each of the sacks according to predetermined zonal combinations of the sacks and according to a predetermined pressure profile across the plurality of sacks, each combination of sacks defining a separate support zone. As embodied herein, the control means preferably includes a multi-outlet, variable flow, gas valve 130 (FIGS. 7, 8, 9, 10 and 11); an exhaust flow control circuit 128 (FIG. 14) for automatically actuating a motor which controls the flow setting of the exhaust valve setting of the multi-outlet valve to regulate the overall flow available to be divided between the support zones of the support structure; and a valve control circuit 174 (FIG. 15) for automatically controlling the valve settings for the multi-outlet, variable flow, gas valve, according to predetermined pressure parameters for the sacks.

In accordance with the control means of the present invention, there is provided a multi-outlet, variable flow, gas valve, comprising: a housing defining an inlet and a passageway, the inlet communicating with the passageway; at least two cylinder chambers defined within the housing and communicating with the passageway; a discrete outlet defined within the housing for each of the cylinder chambers and communicating therewith; and means for variably controlling communication of the passageway with the outlet through the cylinder chamber. As embodied herein and shown for example in FIGS. 7–10, a housing 136 defines a passageway 138 extending along the length thereof. Housing 136 further defines an inlet 140 (FIG. 9) communicating with the passageway 138. In the multi-outlet valve housing 136 further defines at least two cylinder chambers 142 communicating with passageway 138. A discrete outlet 144 is defined in housing 136 for each cylinder chamber and communicates with that cylinder chamber. However, the invention encompasses a single outlet embodiment in which the housing defines only one cylinder chamber and one outlet therefor. The description of the multi-outlet embodiment pertains to the single outlet embodiment in all respects save the number of cylinder chambers and outlets in communication with the inlet and passageway and the number of associated pistons, rotatable shafts, potentiometers, etc., described below.

Preferably, and as shown in the embodiment depicted in FIG. 9, housing 136 defines six separate cylinder chambers and six outlets therefor, of the type shown in FIG. 7. This is because in the preferred embodiment of the support structure of the present invention the inflatable sacks are divided into are five (5) so-called support zones, and there is one exhaust valve setting, the latter being regulated to vary the overall pressure applied to the inflatable sacks in the five zones. Each support zone requires its own valve so that the pressure in a particular support zone can be maintained independently from the pressure in other support zones.

In further accordance with the multi-outlet variable gas flow valve of the present invention, there is provided means for variably controlling communication of the passageway with the outlet through the cylinder chamber. As embodied herein and shown for example in FIG. 7*a*, the variable communication control means comprises a plurality of pistons 146. One piston is provided for each cylinder chamber and is slidably received therein such that passage of gas flow between the wall of cylinder chamber 142 and the piston is substantially prevented. Piston 146 blocks all communication between outlet 144 and passageway 138, when piston 146 is oriented at at least one predetermined location within cylinder chamber 142. Piston 146 permits complete communication between the outlet and the passageway through cylinder chamber, when the piston is oriented at another predetermined location within the cylinder chamber. Piston 146 permits a predetermined degree of communication between the outlet and the passageway through cylinder chamber 146 depending upon the orientation of piston 146 within cylinder chamber 142.

The variable communication control means further comprises means for orienting the piston at a predetermined location within the cylinder chamber. As embodied herein and shown for example in FIG. 7*a*, the means for orienting the piston at a predetermined location preferably comprises a threaded opening 148 extending through piston 146 and concentric with the longitudinal centerline of the piston. The orienting means further preferably comprises a rotatable shaft 150 having a threaded exterior portion 152 engaging threaded opening 148 of piston 146.

In accordance with the present invention, the piston orienting means further comprises means for precluding full rotation of the piston. As embodied herein and shown for example in FIGS. 7a and 8, the means for precluding full rotation of the piston preferably comprises a projection 154 associated therewith and having a free end extending into a channel 155 formed in the wall of cylinder chamber 142 and extending generally axially therealong. Projection 154 can be integrally formed as part of piston 146 or can be a structure attachable thereto.

The piston orienting means further comprises means for rotating the shaft whereby rotation of the shaft causes displacement of the piston along the shaft in the cylinder chamber. The direction of this piston displacement depends upon the direction of rotation of the shaft. As embodied herein and shown for example in FIG. 7a, the shaft rotation means preferably comprises a DC electric motor 160, such as one which permits adequate control over rotation of the shaft to control displacement of the piston therealong. Motor 160 is attached to one end of shaft 150, and accordingly, rotation of motor 160 results in rotation of shaft 150 attached thereto. Motor 160 can communicate with shaft 150 via a reduction gear box, if desired for finer control.

The multi-outlet, variable flow, gas valve still further comprises a flow restriction means which is received within the outlet defined in the housing. As embodied herein and shown for example in FIGS. 7b and 7c, an embodiment of the flow restriction means preferably comprises an elongated-shaped opening 156 defined in valve housing 136 between the outlet and the cylinder chamber. The longitudinal axis of opening 156 is preferably oriented parallel to the longitudinal axis of the cylinder chamber and the shaft.

In operation, motor 160 rotates and drives the shaft in rotational movement therewith. Since the piston cannot rotate in conjunction with shaft because of projection 154 confined within channel 155, piston 146 screws up and down threaded exterior portion 152 of shaft 150 and accordingly repositions itself at different locations inside cylinder chamber 142.

The multi-outlet, variable flow, gas valve further comprises means for indicating the degree of communication between the outlet and the passageway that is being permitted by the piston. As embodied herein and shown for example in FIG. 7a, the degree of communication indicating means comprises a potentiometer 162 having a rotatable axle 164 attached to the end of the shaft opposite the end attached to motor 160. Rotation of axle 164 by shaft 150 varies the voltage output of the potentiometer depending upon the number of rotations of the shaft. Since each shaft rotation moves piston 146 a predetermined distance inside cylinder chamber 142, the voltage output of potentiometer 162 correlates with the flow being permitted to pass through outlet 144 by piston 146. Potentiometer 162 preferably comprises a ten kilo-ohm, ten turn potentiometer having an axle adaptable for attachment to a shaft.

Figure 14:
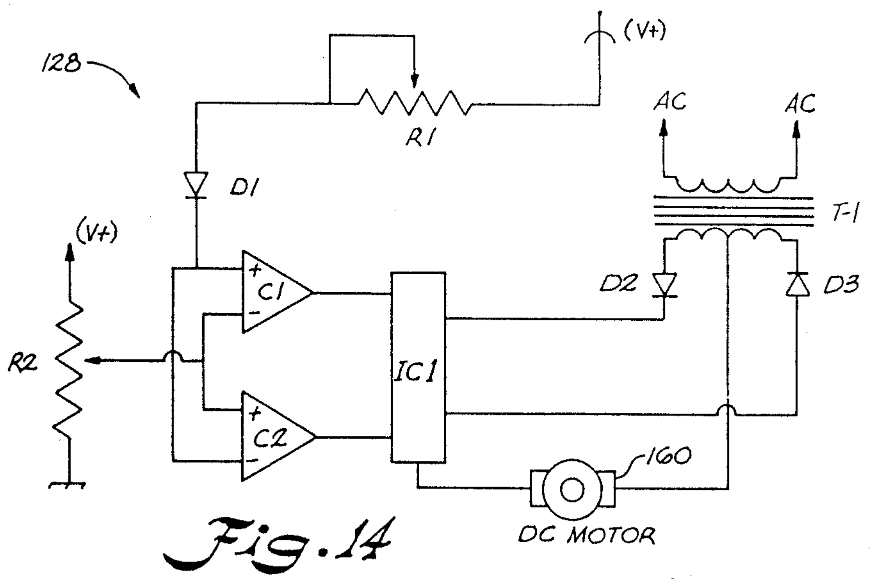
FIG. 14 is a schematic of components of an embodiment of the present invention.

In accordance with the present invention, the control means comprises an exhaust flow control circuit for automatically actuating the motor controlling gas flow through the exhaust outlet of the multi-outlet valve, according to predetermined operating parameters for the blower and depending on the overall flow to be provided to the gas sacks. As embodied herein and shown for example in FIG. 14, the exhaust flow control circuit is generally designated by the numeral 128 and comprises a variable resistor R1 or comparable voltage division device capable of producing the desired variable control voltage. Variable resistor R1 or comparable voltage division device is housed in a control box 134, such as the control box shown in FIG. 16, in a manner accessible only to service personnel and not to the patient or medical personnel attending the patient. Variable resistor R1 is connected to a diode element D1, which passes the signal from R1 to the inputs of comparators C1 and C2. As shown in FIG. 14, the signal from R1 is provided to the plus side input of comparator C1 and the minus side input of comparator C2. A second voltage signal is derived from another variable resistor R2, which signal also is applied to the other input of each of comparators C1 and C2. As shown in FIG. 14, the signal from R2 is provided to the minus side input of comparator C1 and the plus side input of comparator C2. Preferably, comparators C1 and C2 are type "339" integrated circuits or similar comparators. In operation, each comparator compares the voltage at its plus and minus input terminals and produces a "high" or "low" output according to the well known rules of the comparator's operation. Typically, zero volts constitutes the low output of a comparator, and approximately the supply voltage constitutes the high output of a comparator.

As shown in FIG. 14, comparators C1 and C2 provide their output to a first integrated circuit IC1, which is "hard-wired" to yield an output depending upon whether the outputs received from comparators C1 and C2 are either high and low, or low and high, respectively. For example, if C1 sends a high output to integrated circuit IC1, then C2 will have sent a low output to integrated circuit IC1, and integrated circuit IC1 will connect DC motor 160, which is mechanically connected to control the flow through the exhaust outlet of the multi-outlet valve (FIG. 7a), via a second diode D2, to the AC power supply. Thus, the motor will be driven by a half wave direct current, which will cause motor 160 to rotate in a given direction, either clockwise or counterclockwise. Alternatively, if comparator C1 output is low, then comparator C2 output will be high, and integrated circuit IC1 will connect motor 160 via a third diode D3, such that the resulting half wave direct current causes the motor to rotate in a direction opposite the previous direction. Rotation of motor 160 varies the flow output setting of the exhaust outlet, and also turns variable resistor R2, which is designated by the numeral 162 in FIG. 7a. This causes a reference feedback voltage to be supplied comparators C1 and C2 and thereby indicates the current flow setting of the exhaust outlet.

In operation, the exhaust flow control circuit runs DC motor 160, and in turn adjusts the voltage setting of potentiometer 162, as long as the reference voltage across variable resistor R2 (potentiometer 162) differs from the voltage coming from variable resistor R1. When the voltage at the reference output of variable resistor R2 is essentially equal to the preset voltage arriving at the comparators through variable resistor R1, then the control circuit ceases supplying power to motor 160, and the exhaust outlet flow setting remains constant. Accordingly, the proportion of flow being supplied to the gas sacks remains constant. DC motor 160 will continue to rotate, in either direction, until the preset voltage of variable resistor R1 balances the reference voltage provided to the output terminal of variable resistor R2 (FIG. 14), which corresponds to potentiometer 162 in FIG. 7a.

In practice, a technician would preset variable resistor R1 depending upon the weight characteristic of the patient to be supported on the support structure of the present invention. The heavier patient would require greater sack pressure, and accordingly a greater proportion of flow to the gas sacks would be required. The greater flow requirement would mean that motor 160 needs to close the exhaust outlet flow opening to a lower setting. Accordingly, the R1 would be preset so that the R1/R2 balance is attained at a relatively low opening setting of the exhaust outlet.

As shown in FIG. 11, the sacks comprising each individual support zone are connected via a respective individual conduit means to a manifold 166 having a number of outlets appropriate to the number of sacks in that particular support zone. The manifold has a single inlet which is connected via piping 98 comprising the gas supply means of the present invention, to an outlet of one of the individual valves comprising the multi-outlet, variable flow, gas valve of the present invention.

As shown in FIG. 9, the air blower conveys compressed air through a duct 168 which is connected to inlet 140 of the multi-outlet, variable flow, gas valve and comprises a plurality of metal tube sections 170 connected via a plurality of soft plastic sleeves 172. The compressed air travels into passageway 138 (FIG. 7*a*) and is distributed through the respective cylinder chambers and outlets of the individual valve sections comprising the multi-outlet valve of the invention, depending upon the location of the pistons associated therewith. Each valve motor 160 (FIG. 9) can be operated to adjust the position of each piston and accordingly affect the air flow distribution exiting through the outlet and elongated-shaped opening associated therewith. At any given setting of flow through the exhaust outlet, the air flow distribution, and accordingly the pressure, provided in each of the five support zones can be varied depending upon the setting of each piston location inside each respective cylinder chamber. The manner in which the pressure level for each of the five (5) support zones is preset and automatically maintained at the preset pressure, now will be described.

In further accordance with the control means of the present invention, there is provided a zone valve control circuit for automatically controlling each of the support zone valve settings for the multi-outlet, variable flow, gas valve, according to predetermined pressure parameters for the sacks in each zone. As embodied herein, the zone valve control circuit preferably comprises an electronic circuit shown schematically in FIG. 15, and generally designated by the numeral 174.

Figure 15:
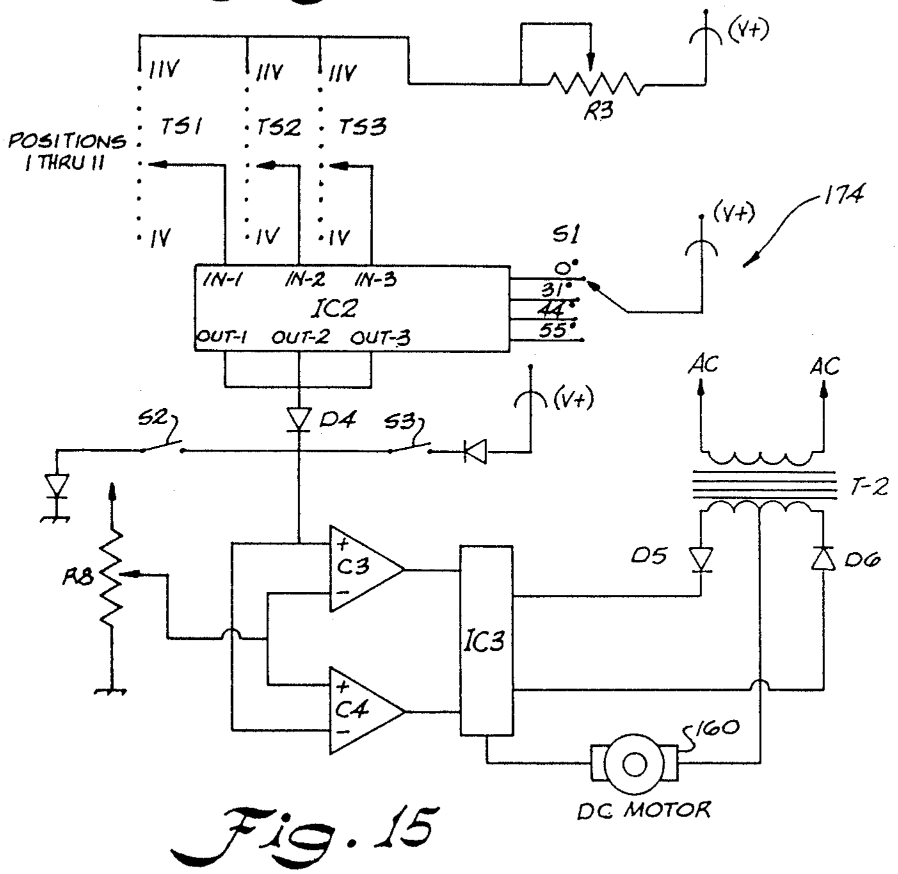
FIG. 15 is a schematic of components of an embodiment of the present invention.

A zone valve control circuit similar to the one depicted in FIG. 15, is used to control each of the five valves which is associated with one of the five support zones, and which comprises the multi-outlet valve of the invention. The zone valve control circuit embodiment of FIG. 15 is similar to the exhaust flow control circuit embodiment depicted in FIG. 14. Once the signal received from a second integrated circuit IC2 is supplied to a diode element designated D4 in FIG. 15, the zone valve control circuit operates like the FIG. 14 exhaust flow control circuit.

The principal difference between the operation of the zone valve control circuit of FIG. 15 and the exhaust flow control circuit of FIG. 14, is the provision in the former of second integrated circuit IC2 which determines the magnitude of the signal received by diode D4 depending on a signal received from a circuit element designated S1 in FIG. 15.

In operation, second integrated circuit IC2 connects one and only one of its three possible inputs to its output. The particular input connected to the output is selected based upon the signal which integrated circuit IC2 receives from S1. For example, with S1 in the position indicated as 0°, integrated circuit IC2 connects a voltage preselected by thumbwheel switch TS1 to diode element D4, by internally relaying the signal from input terminal number one (In-1) to output terminal number one (Out-1). Thus, integrated circuit IC2 can be considered to be an electronically operated equivalent to a mechanical switch or relay, and has the advantage of smaller size over the switch or the relay. Second integrated circuit IC2 is preferably a type "4066" integrated circuit or a similar analog switch, and is known in the industry as a "quad analog switch."

Figure 17:
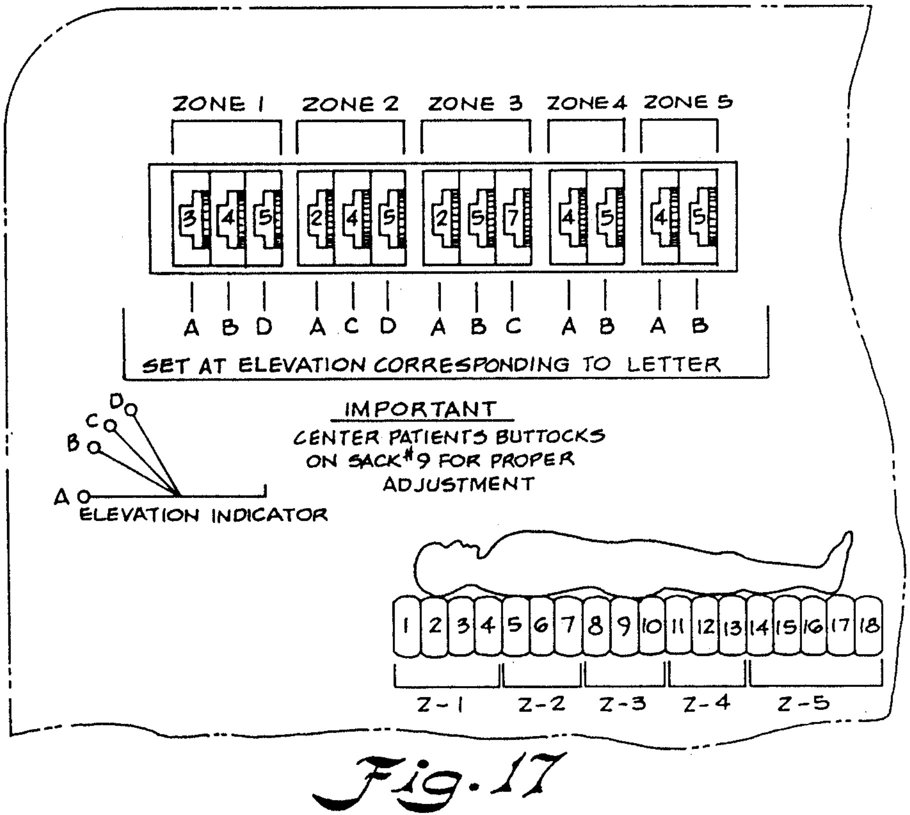
FIG. 17 is a partial front plan view of components of an embodiment of the present invention.

The signal which passes through the second integrated circuit as previously described, depends upon the setting of S1 and also upon the setting of the particular thumbwheel switch which S1 connects to the output of IC2. Preferably, each thumbwheel switch (TS1, TS2 or TS3) has 10 distinct voltage signal outputs. The particular voltage signal output of a particular thumbwheel switch is predetermined based upon the optimum flow setting arrangement for the particular patient and is preset accordingly from the console illustrated in FIG. 17. As shown in FIG. 17, the zone 1 settings (A, B and D) of thumbwheel switches TS1, TS2 and TS3 correspond to particular elevation range settings of zones 1 and 2 of the support structure. When the support structure is elevated as shown by the schematic elevation indicator at A in the display panel of FIG. 17, then the thumbwheel switch designated A will be connected from one of the input terminals of IC2 to a corresponding output terminal of IC2 and eventually through diode element D4. When the support structure is elevated as indicated by the elevation indicator at B, then the thumbwheel switch setting designated B will be connected through IC2 to diode element D4. This is the case for each of the five zones, as each zone is provided with a separate zone valve control circuit. However, as shown in FIG. 17, the pressure profile in a particular zone need not change for each of the four elevation indicator settings (A, B, C and D). For example, the zone 1 setting will change for elevation indicator settings A, B and D, but not for elevation indicator setting C. Similarly, the zone 2 setting will change for elevation indicator settings A, C and D, but not for elevation setting indicator setting B. This is why the zone valve control circuit depicted in FIG. 14 shows only thumbwheel switches TS1, TS2 or TS3. Moreover, because less control is required for zones 4 and 5, only two thumbwheel switches are required for the valve control circuits for these two zones.

The voltage passing through the second integrated circuit is supplied to one of the inputs of comparators C3 and C4. A second voltage derived from a variable resistor R8 is applied to the other comparator inputs. Preferably, the comparators are type "339" integrated circuits or similar comparators. The ultimate purpose of these comparators is to cause the rotation of the DC motor associated with each of the cylinder chambers of the multi-outlet, variable flow, gas valve, in the correct direction to open or close the valve as desired and determined by the voltage arriving at the comparators from second integrated circuit IC2. In operation, the comparators compare the voltage at their plus and minus input terminals and produce a "high" or "low"

output according to well known rules of their operation. Typically, zero volts constitutes the low output of a comparator, and the approximate applied voltage to the comparator constitutes the high output of a comparator.

In an alternative embodiment, a pressure sensor provides an electronic signal instead of the signal derived from variable resistor element R8. The pressure sensor would be located preferably in one of gas supply lines 98 (see FIG. 11) leading from each of the separate outlets of multi-outlet valve 130. A Honeywell brand PC 01G pressure sensor constitutes one example of a pressure sensor suitable for the function just described.

As shown in FIG. 15, comparators C3 and C4 provide their output to a third integrated circuit IC3, which is "hard-wired" to yield an output depending upon whether the outputs received from comparators C3 and C4 are high and low, or low and high, respectively. For example, if the C3 output is high, then the C4 output will be low, and third integrated circuit IC3 will connect the DC motor of a particular variable flow gas valve via a diode designated D5, to the AC power supply. Thus, the motor will be driven by half wave direct current which will cause the motor to rotate in a given direction. Alternatively, if comparator C3 output is low, then comparator C2 output will be high, and integrated circuit IC3 will connect the DC motor via a diode designated D6, such that the resulting half wave direct current causes the motor to rotate in a direction opposite the previous direction. When the motor rotates, it opens/closes the valve associated therewith and also rotates the potentiometer associated with the indicator means of the valve. This potentiometer is represented schematically in FIG. 15 by the designation R8 and supplies a voltage to comparators C3, C4, and thereby indicates the relative amount of flow permitted by the piston inside the valve's cylinder chamber. In practice, the zone valve control circuit operates by running the motor, and in turn the valve and potentiometer R8, until the voltage at the wiper of R8 is essentially equal to the set voltage arriving at comparators C3, C4 from second integrated circuit IC2. Third integrated circuit IC3 may conveniently be any of several commercially available motor driver integrated circuits, or it may be comprised of discreet transistors and associated passive components.

Each thumbwheel switch TS1, TS2 and TS3 of the zone valve control circuit embodiment of FIG. 15, corresponds to the valve opening setting considered optimum for a particular patient when the head section of the frame is positioned at one of the four head section articulation ranges, namely 0° to 31°, 31° to 44°, 44° to 55°, and 55° to the maximum articulation angle, which typically is 62°. Second integrated circuit IC2 receives a reference signal indicating the current range of the angle of elevation of the head section of the frame and accordingly selects the path of the applied signal through one of thumbwheel switches TS1, TS2, or TS3.

Each of the thumbwheel switches designated TS1, TS2, and TS3 is not readily accessible to the patient or attending medical staff and typically is mounted on a panel (FIG. 17) located on the side of the bed beneath the head thereof and near the blower housing. These thumbwheel switches are preset by a service technician to a signal level corresponding to the valve setting, and thus support zone pressure level, that is suited to the patient at a particular range of elevation angle of the head section of the frame.

Figure 16:
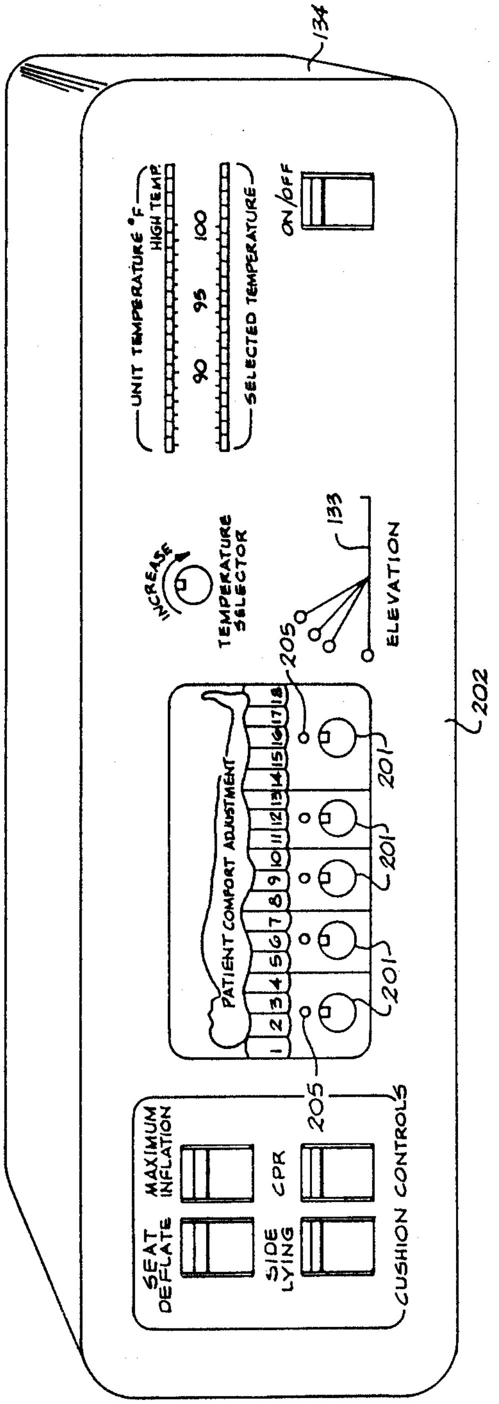
FIG. 16 is a front plan view of a component of an embodiment of the present invention.

Referring to FIG. 15, R3 preferably is a variable resistor in series with each of thumbwheel switches TS1, TS2 and TS3. Variable resistor R3 is associated with an adjustment which is accessible to the medical staff as a "comfort" adjustment and yields approximately ten percent of the total signal level represented by R3 and any one of the other three signals from TS1, TS2 or TS3. As shown in FIG. 16, the patient or nursing staff has access to R3 by a "ZONE COMFORT ADJUSTMENT" knob 201, which is attached to the shaft of R3 and mounted on a front panel 202 of control box 134.

Figure 3B:
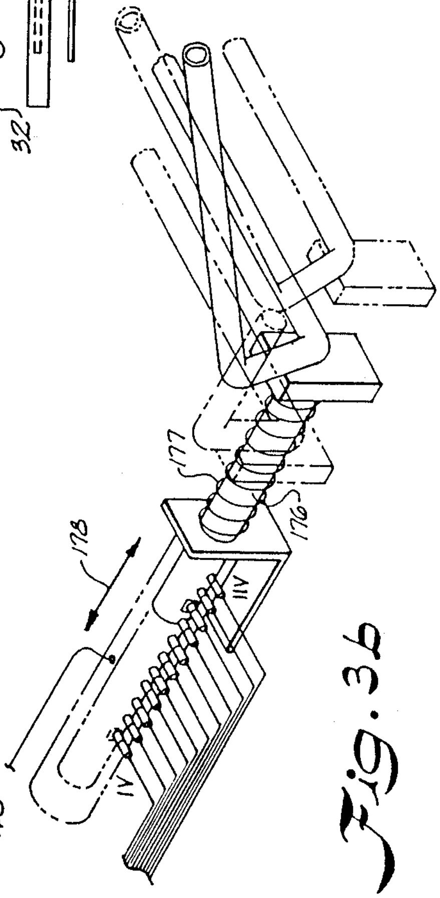
FIG. 3*b* is a schematic view of components of an embodiment of the present invention with two alternative conditions indicated in phantom.

In accordance with the present invention, there is provided articulation sensing means associated with the frame for determining the degree of elevation of the head portion of the frame. As embodied herein and shown for example in FIGS. 3*a* and 3*b*, the articulation sensing means of the present invention preferably comprises a rod 176 having one end communicating with an articulatable section of the frame, for example the head section, whereby articulating movement of the articulatable section displaces rod 176 along the longitudinal axis thereof, as indicated by a double headed arrow 178. As shown in FIG. 3*b*, the rod is mechanically biased against a portion of the head section by a spring 177. As shown in FIG. 3*b*, the body of rod 176 comprises part of a step-wise linear switch.

Upon displacement of rod 176 along the longitudinal axis thereof, the body of rod 176 closes a circuit to yield a particular reference voltage signal. The longitudinal movement of rod 176 is calibrated to the angular movement of the articulatable section from a horizontal reference plane. This angle is designated in FIG. 3 by the Greek letter theta $\theta$. When rod 176 moves the body into position to close a circuit yielding the first encountered reference voltage of the step-wise linear switch, a signal is sent to each of the valve control circuits of the present invention. This signal is equivalent to that schematically illustrated in FIG. 15 as produced from (V+) by the action of S1.

Two additional alternative embodiments are envisioned for the articulation sensing means. One alternative embodiment of the articulation sensing means comprises a light transmitter and a light receiver communicating with one another through a disk associated with the shaft about which the articulated member would rotate. The disk has a plurality of holes therein that can be provided to correlate with the angle of articulation of the articulating member. Accordingly, articulation of the articulating member by a particular angle of rotation positions one of the holes in the disk between the light transmitter and the light receiver such that the light receiver sends a signal in response to the light transmitted from the light transmitter. A GE type H-13A1 photon coupled interrupter module constitutes one example of a suitable light transmitter and light receiver for this purpose.

Another embodiment of the articulation sensing means comprises a spring-loaded retractable tape having a plurality of holes therethrough along the length thereof. The tape can be attached to the end of rod 176 for example. A light transmitter and a light receiver are positioned opposite one another on opposide sides of the tape. Accordingly, longitudinal movement of the rod withdraws the tape and at some point positions one of the holes between the light transmitter and the light receiver, thus permitting transmission of light between the two and actuation of the receiver to send a signal to the S1 component of the zone valve control circuit. Alternatively, the end of the tape can be directly attached to the articulating member rather than attached to the end of rod 176.

In further accordance with the present invention, the zone valve control circuit further comprises articulation pressure adjustment means which is operatively associated with the articulation sensing means to vary gas pressure in sacks located in each of the support zones of the support structure of the present invention. The articulation pressure adjustment means varies the gas pressure in a particular zone according to the degree of elevation of an articulatable section of the frame as determined by the articulation sensing means. As embodied herein and shown for example in FIG. 15, the articulation pressure adjustment means preferably comprises a plurality of thumbwheel switches TS1, TS2 and TS3 and an integrated circuit having a plurality of input terminals and a plurality of output terminals. Each of the thumbwheel switches communicates with one of the input terminals of the integrated circuit, which receives a signal from the articulation sensing means. Second integrated circuit IC2 selects which of the thumbwheel switches is to be used to form the circuit that supplies the applied voltage to diode element D4, based upon the signal received from the articulation sensing means (S1).

Second integrated circuit IC2 (FIG. 15) associates the signal received from the step-wise linear switch (S1), with a particular angular range of articulation of a section of the frame. When rod 176 (FIG. 3) is at its fully biased position, second integrated circuit IC2 receives a signal indicating that the head section is at an angular range of articulation of between 0° and 31° from the horizontal, i.e., unarticulated position. Thus, when rod 176 travels longitudinally further in response to further articulation of the head section of the frame, the first encountered circuit on the step-wise linear switch is closed. Then the signal sent to second integrated circuit IC2 indicates articulation of head section at an angle between 31° and 44° from the horizontal. Similarly, closing of the second-encountered circuit of the step-wise linear switch sends a signal to second integrated circuit IC2 indicating that the head section has passed through an angle of 44° from the horizontal plane.

As explained above, reception of these signals by second integrated circuit IC2 of each of the zone valve control circuits, causes the particular valves of the multi-outlet, variable flow, gas valve controlled by that circuit, to open and close in accordance with the preset thumbwheel switches TS1, TS2 and TS3 of that circuit. These thumbwheel switches correspond to one or more ranges of angular settings sensed by the articulation sensing means. For example, in zone one, TS1 may correspond to the 0° to 31° range, TS2 to the 31° to 44° range and the 44° to 55° range, and TS3 to the ranges 55° to 62° range. These thumbwheel switches have been preset by technical personnel to provide the proper pressure in the sacks for the particular patient resting atop the patient support structure of the present invention, with the head section articulated at the angular range associated with that thumbwheel switch setting.

A "stick man" display 133 of control box 134 (FIG. 16) indicates the current articulation angle of the head section of the frame. This display is also useful to the service technician who is responsible for setting the initial adjustments to TS1, TS2 and TS3 of the valve control circuit shown in FIG. 15.

In further accordance with the present invention, at least certain of the sacks in certain of the support zones have valve means associated therewith for total deflation of individual sacks so that upon full deflation, the patient can be removed from the support structure of the invention and alternatively the patient can be manipulated for facilitating a predetermined patient treatment procedure, such as cardiopulmonary resuscitation (CPR). In accordance with the present invention, certain support zones have deflation valve means associated therewith for total deflation of the sacks in those certain support zones. As embodied herein and shown schematically for example in FIG. 11, the total deflation valve means preferably comprises a solenoid operated valve 198. One such valve is provided in the piping which connects the gas blower to the zone one pipe manifold 194, and another solenoid operated valve is provided in the piping which connects the gas blower to the zone two pipe manifold 196. Upon activation of either solenoid operated valve 198, the valve vents the respective pipe manifold, and accordingly the gas sacks connected thereto, to atmosphere through a venting line 200.

Activation of the "CPR" switch of control box 134 (FIG. 16) deprives the blower of electrical power and actuates two solenoid valves 198 which speed the gas outflow from the sacks of support zones one and two. Deflation of the sacks of zones one and two facilitates the CPR procedure by resting the upper torso of the patient on the rigid plates of the upper frame.

FIG. 15 also shows two additional features of the valve control circuit of the present invention, and these features are represented schematically by S2 and S3, which are both operator accessible switches on the control panel depicted in FIG. 16. S2 corresponds to the switch labelled "SEAT DEFLATE" in FIG. 16, and S3 corresponds to the switch labelled "MAXIMUM INFLATION.

Operation of S2 brings the comparator inputs to which S2 is connected, to essentially zero voltage. This zero voltage condition corresponds to a fully closed valve and overrides the voltage signal arriving from the second integrated circuit IC2. The fully closed valve function obtained by actuation of S2 is employed in zones 3 and 4 to provide the seated transfer function, and accordingly S2 only exists in the zone valve control circuits associated with the valves which supply support zones 3 & 4. In the zone valve control circuits controlling the air pressure in the sacks of zones 3 and 4, an additional resistor is employed between D4 and IC2 to limit the current flowing through S2 to ground.

To explain the SEAT DEFLATE function performed by the present invention, it becomes necessary to refer to FIGS. 2, 7, 11 and 15. As shown in FIGS. 2 and 11, zone three comprises sacks numbered 8 through 10, and zone four comprises sacks numbered 11 through 13. The patient shown in FIG. 2 is moved to a sitting position in the vicinity of support zones 3 & 4. Then the SEAT DEFLATE switch on the control panel is activated. Activation of S2 (FIG. 15) closes the valves (FIG. 7*a*) controlling the gas supply means leading to the sacks in support zones 3 & 4. Since the air blower no longer can supply air to sacks 8–13, the weight of the patient sitting thereon causes the sacks to deflate and accordingly lowers the patient to the height of the membrane resting atop the upper surface of the upper frame member. At the same time, the sacks on either side of zones 3 & 4 remain inflated and provide arm rests for the patient to assist the patient in dismounting from the support structure.

Operation of S3 has two effects. First, it brings the comparator inputs to which it is connected, to essentially the input voltage (V+) and in the process overrides the voltage signal from second integrated circuit IC2. Thus, operation of S3 causes the valve to become fully open and is employed in the valve control circuit for all five zones to provide the transfer sacks with maximum inflation to provide a firm surface from which to facilitate movement of the patient out of the bed. Although not shown in FIG. 15, operation of S3 also causes an audible alarm and completely closes the exhaust valve 99 (FIG. 11) of the multi-outlet, variable gas flow valve to produce full air flow from the blower through the five valves controlling the gas supplied to the five support zones. Thus, with the exhaust valve fully closed, all of the sacks are receiving maximum air flow and becoming overinflated. This overinflated condition renders the sacks very firm and permits the patient to be more easily slid off the top walls of the sacks for transfer to a different bed or stretcher.

FIG. 16 illustrates a plan view of a control panel 202 provided for the operation of some of the features of the present invention. For example, the switch labelled "ON/OFF" controls the provision of electrical power to all of the air supply components, while permitting the elevation controls and the like of the bed to remain operational.

The SIDE LYING switch is connected to the exhaust valve of the multi-outlet, variable gas flow valve. Activation of the SIDE LYING switch causes the exhaust valve to close to an extent that approximately 5% more gas flow is provided through the other five vavles which control the supply to the five support zones of the support structure. In this way, the firmness of the sacks is increased slightly to compensate for the added pressure applied by the patient to the sacks when the patient is lying on the side of the body.

The "TEMPERATURE SELECTOR" control knob provides a means to manually control a standard electrical resistance type gas heater and an optional cooling fan which transfers heat from the fins of a fin-and-tube heat exchanger 101 (FIGS. 2 and 11). Gas pipes 98 pass through fin-and-tube type heat exchanger 101 to cool the compressed air, as desired. The bar graph to the right of the temperature selector knob is employed to monitor and display the temperature of the gas supplied to the gas sacks. An over temperature protection circuit (not shown) shuts down the heater if the temperature of the gas reaches a patient threatening temperature.

In further accordance with the present invention, deflation detection means are provided for detecting a predetermined degree of deflation in at least one of the plurality of sacks atop the frame of the support structure of the present invention. As embodied herein and shown for example in FIG. 11, the deflation detection means preferably comprises at least one force sensitive switch 204 provided atop the plates forming the upper planar surface of the upper frame member. The force sensitive switches are located between the plates and the neoprene sheet upon which the bottom walls of the gas sacks rest. These switches are activated when the body forces of the patient cause these switches to close. Suitable force sensitive switches comprise two silver grids separated by insulator pads at cross-points of each grid such that force applied to the grids intermediate the insulator pads creates contact between the two grids and forms a circuit through which a signal is passed, as for example through a lead 203 (FIG. 11). Additional circuitry (not shown) is provided to enable the deflation detectors to actuate an audible alarm and provide a signal to the comparators which will cause the valve associated with the affected zone to open until air flow is sufficient to eliminate the bottoming condition. As shown in FIG. 11, deflation detectors 204 are oriented so as not to extend over the boundry that separates adjacent support zones. This is because the signal derived from any particular deflation detector 204 is provided to vary the pressure of the sacks of a particular support zone.

Indicator means are provided in accordance with the present invention for communicating with the deflation detection means and being actuated by same when the deflation detection means is actuated upon detecting a predetermined degree of deflation in at least one of the sacks. As embodied herein and shown for example in FIG. 16, the indicator means preferably comprises a small red/greed light emitting diode (LED) 205 which changes from a normal green illumination to a red illumination upon actuation by a signal received from one of force sensitive switches 204. The small red/green light emitting diodes (LED) are positioned immediately above the "ZONE COMFORT ADJUSTMENT" knobs, which correspond to variable flow resistor R3 of FIG. 15, on control panel 202 of control box 134. The LED's change from their normal green illumination to a red illumination, if actuated when a "bottoming" condition is detected by one of a plurality of force sensitive switches 204 (FIG. 11) provided atop the plates forming the upper planar surface of the upper frame member.

It will be apparent to those skilled in the art that various modifications and variations can be made in the improved patient support structure of the present invention and in the construction of the gas distribution valve without departing from the scope or spirit of the invention. Thus, it is intended that the present invention cover the modifications and variations of this invention, provided they come within the scope of the appended claims and their equivalents.

What is claimed is:

1. A multi-outlet, variable flow gas valve, comprising:

(a) a housing defining an inlet and a passageway, said inlet communicating with said passageway;

(b) at least two cylinder chambers defined within said housing and communicating with said passageway, each said chamber having a longitudinal centerline therethrough;

(c) a discrete outlet defined in said housing for each said cylinder chamber and communicating therewith, said outlet being disposed perpendicularly to said longitudinal centerline of said cylinder chamber; and (d) means for variably controlling communication of said inlet with each said outlet through said passageway and each said cylinder chamber, said variable communication control means comprising:

(i) a piston slidably received within each said cylinder chamber, said piston blocking all communication between each said outlet and said inlet when said piston is oriented at at least one predetermined location within said cylinder chamber, said piston permitting maximum communication between said outlet and said inlet through said cylinder chamber when said piston is oriented at another predetermined location within said cylinder chamber, said piston permitting a predetermined degree of communication between said outlet and said inlet through said cylinder chamber depending on the orientation of said piston within said cylinder chamber; and (ii) means for orienting said piston at a predetermined location within said cylinder chamber, said means for orienting said piston comprising:

(i') a threaded opening extending through said piston and concentric with said longitudinal center line thereof;

(ii') a rotatable shaft having a threaded exterior portion engaging said threaded opening of said piston;

(iii') means for rotating said shaft whereby rotation of said shaft causes displacement of said piston along said shaft in said cylinder chamber, the direction of said displacement depending on the direction of rotation of said shaft; and (iv') means for precluding full rotation of each said piston, said rotation preclusion means comprising a channel formed in a wall of said cylinder chamber and extending generally along the longitudinal axis thereof and a projection associated with said piston and having a free end extending into and confined within said channel of said cylinder chamber.

2. A valve as in claim 1, further comprising:

means for indicating the degree of communication between each said outlet and said passageway, being permitted by said piston.

3. A valve as in claim 2, wherein:

said indicating means comprises a potentiometer having a rotatable axle associated with said rotatable shaft, for varying the voltage output of said potentiometer depending upon the number of rotations of said shaft and said axle attached thereto.

4. A valve as in claim 3, further comprising:

a flow restriction means for each said outlet, each said flow restriction means being defined by said housing between each said cylinder chamber and each said outlet, each said flow restriction means having an elongated-shaped opening, the longitudinal axis of said elongated-shaped opening being oriented parallel to the longitudinal axis of said shaft.

5. A valve as in claim 1, wherein:

said means for rotating said shaft comprises a motor attached thereto.

6. A valve as in claim 1, further comprising:

a flow restriction means for each said outlet, each said flow restriction means being defined by said housing between each said cylinder chamber and each said outlet, each said flow restriction means having an elongated-shaped opening, the longitudinal axis of said elongated-shaped opening being oriented parallel to the longitudinal axis of said shaft.

7. A multi-outlet, variable flow gas valve, comprising:

(a) a housing defining an inlet and a passageway, said inlet communicating with said passageway:

(b) at least two cylinder chambers defined within said housing and communicating with said passageway, each said chamber having a longitudinal centerline therethrough;

(c) a discrete outlet defined in said housing for each said cylinder chamber and communicating therewith, said outlet being disposed perpendicularly to said longitudinal centerline of said cylinder chamber, each said outlet including a flow restriction means for each said outlet, each said flow restriction means being defined by said housing between each said cylinder chamber and each said outlet, each said flow restriction means having an elongated-shaped opening, the longitudinal axis of said elongated-shaped opening being oriented parallel to the longitudinal axis of said shaft; and (d) means for variably controlling communication of said inlet with each said outlet through said passageway and each said cylinder chamber, said variable communication control means comprising:

(i) a piston slidably received within each said cylinder chamber, said piston blocking all communication between each said outlet and said inlet when said piston is oriented at at least one predetermined location within said cylinder chamber, said piston permitting maximum communication between said outlet and said inlet through said cylinder chamber when said piston is oriented at another predetermined location within said cylinder chamber, said piston permitting a predetermined degree of communication between said outlet and said inlet through said cylinder chamber depending on the orientation of said piston within said cylinder chamber; and (ii) means for orienting said piston at a predetermined location within said cylinder chamber, said means for orienting said piston comprising:

(i') a threaded opening extending through said piston and concentric with said longitudinal center line thereof;

(ii') a rotatable shaft having a threaded exterior portion engaging said threaded opening of said piston;

(iii') means for rotating said shaft whereby rotation of said shaft causes displacement of said piston along said shaft in said cylinder chamber, the direction of said displacement depending on the direction of rotation of said shaft; and (iv') means for precluding full rotation of said piston, said rotation preclusion means comprising a channel formed in a wall of said cylinder chamber and extending generally along the longitudinal axis thereof and a projection having one end fixed to said piston and the opposite end extending into said channel of said cylinder chamber.

8. A single outlet, variable flow gas valve, comprising:

(a) a housing defining an inlet and a passageway, said inlet communicating with said passageway;

(b) a cylinder chamber defined within said housing and communicating with said passageway, said chamber having a longitudinal centerline therethrough;

(c) a discrete outlet defined in said housing and communicating with said cylinder chamber, said outlet being disposed perpendicularly to said longitudinal centerline of said cylinder chamber; and (d) means for variably controlling communication of said inlet with said outlet through said passageway and said cylinder chamber, said variable communication control means comprising;

(i) a piston slidably received within said cylinder chamber, said piston blocking all communication between said outlet and said inlet when said piston is oriented at at least one predetermined location within said cylinder chamber, said piston permitting maximum communication between said outlet and said inlet through said cylinder chamber when said piston is oriented at another predetermined location within said cylinder chamber, said piston permitting a predetermined degree of communication between said outlet and said inlet through said cylinder chamber depending on the orientation of said piston within said cylinder chamber; and (ii) means for orienting said piston at a predetermined location within said cylinder chamber, said means for orienting said piston comprising:

(i') a threaded opening extending through said piston and concentric with said longitudinal center line thereof;

(ii') a rotatable shaft having a threaded exterior portion engaging said threaded opening of said piston;

(iii') means for rotating said shaft whereby rotation of said shaft causes displacement of said piston along said shaft in said cylinder chamber, the direction of said displacement depending on the direction of rotation of said shaft; and (iv') means for precluding full rotation of said piston, said rotation preclusion means comprising a channel formed in a wall of said cylinder chamber and extending generally along the longitudinal axis thereof and a projection associated with said piston and having a free end extending into said channel of said cylinder chamber.

9. A valve as in claim 8, further comprising:

means for indicating the degree of communication between said outlet and said passageway, being permitted by said piston.

10. A valve as in claim 9, wherein:

said indicating means comprises a potentiometer having a rotatable axle associated with said rotatable shaft, for varying the voltage across said potentiometer depending upon the number of rotations of said shaft and said axle attached thereto.

11. A valve as in claim 10, further comprising:

a flow restriction means for said outlet, said flow restriction means being defined by said housing between said cylinder chamber and said outlet, said flow restriction means having an elongated-shaped opening, the longitudinal axis of said elongated-shaped opening being oriented parallel to the longitudinal axis of said shaft.

12. A valve as in claim 8, wherein:

said means for rotating said shaft comprises a motor attached thereto.

13. A valve as in claim 8, further comprising:

a flow restriction means for said outlet, said flow restriction means being defined by said housing between said cylinder chamber and said outlet, said flow restriction means having an elongated-shaped opening, the longitudinal axis of said elongated-shaped opening being oriented parallel to the longitudinal axis of said shaft.

14. A single-outlet, variable flow gas valve, comprising:

(a) a housing defining an inlet and a passageway, said inlet communicating with said passageway;

(b) a cylinder chamber defined within said housing and communicating with said passageway, said chamber having a longitudinal centerline therethrough;

(c) a discrete outlet defined in said housing and communicating with said cylinder chamber, said outlet being disposed perpendicularly to said longitudinal centerline of said cylinder chamber, said outlet including a flow restriction means, said flow restriction means being defined by said housing between said cylinder chamber and said outlet, each said flow restriction means having an elongated-shaped opening, the longitudinal axis of said elongated-shaped opening being oriented parallel to the longitudinal axis of said shaft; and (d) means for variably controlling communication of said inlet with said outlet through said passageway and said cylinder chamber, said variable communication control means comprising:

(i) a piston slidably received within said cylinder chamber, said piston blocking all communication between said outlet and said inlet when said piston is oriented at at least one predetermined location within said cylinder chamber, said piston permitting maximum communication between said outlet and said inlet through said cylinder chamber when said piston is oriented at another predetermined location within said cylinder chamber, said piston permitting a predetermined degree of communication between said outlet and said inlet through said cylinder chamber depending on the orientation of said piston within said cylinder chamber; and (ii) means for orienting said piston at a predetermined location within said cylinder chamber, said means for orienting said piston comprising:

(i') a threaded opening extending through said piston and concentric with said longitudinal center line thereof;

(ii') a rotatable shaft having a threaded exterior portion engaging said threaded opening of said piston;

(iii') means for rotating said shaft whereby rotation of said shaft causes displacement of said piston along said shaft in said cylinder chamber, the direction of said displacement depending on the direction of rotation of said shaft; and (iv') means for precluding full rotation of said piston, said rotation preclusion means comprising a channel formed in a wall of said cylinder chamber and extending generally along the longitudinal axis thereof and a projection having one end fixed to said piston and the opposite end extending into said channel of said cylinder chamber.

* * * * *